United States Patent [19]

Paratte et al.

[11] Patent Number: 5,180,940
[45] Date of Patent: Jan. 19, 1993

[54] RADIAL FIELD ELECTROSTATIC MICROMOTOR PRODUCED USING A PHOTOLITHOGRAPHIC MICROMANUFACTURING TECHNIQUE AND A PROCESS FOR PRODUCING SAID MICROMOTOR

[75] Inventors: Lionel Paratte, Neuchâtel; Etienne Bornand, Boudry; Georges-André Racine, La Chaux-de-Fonds, all of Switzerland

[73] Assignee: Asulab S.A., Bienne, Switzerland

[21] Appl. No.: 752,580

[22] PCT Filed: Feb. 6, 1991

[86] PCT No.: PCT/CH91/00030
§ 371 Date: Sep. 11, 1991
§ 102(e) Date: Sep. 11, 1991

[87] PCT Pub. No.: WO91/12650
PCT Pub. Date: Aug. 22, 1991

[30] Foreign Application Priority Data

Feb. 9, 1990 [CH] Switzerland .................... 00426/90
Feb. 23, 1990 [FR] France .......................... 90 02385

[51] Int. Cl.$^5$ ............................................ H02N 1/00
[52] U.S. Cl. ........................ 310/40 MM; 310/309; 156/650
[58] Field of Search ............... 310/40 MM, 308, 309, 310/310; 156/650, 651, 625; 318/116

[56] References Cited

U.S. PATENT DOCUMENTS 3,436,630  4/1969  Bollee ................................ 318/116
3,629,624  12/1971  Staudte ............................. 310/309
4,997,521  3/1991  Howe et al. ...................... 156/651
5,043,043  8/1991  Howe et al. ...................... 156/645
5,093,594  3/1992  Mehregancy ..................... 310/82

OTHER PUBLICATIONS

Sensors and Actuators; vol. 20 No. 1, Nov. 15, 1989 pp. 41-47 Long-Shen Fan etc.
Thin Solid Films; vol. 181, No. 1, Dec. 10, 1989; pp. 235-243 Roger T. Howe.

Primary Examiner—Emanuel T. Voeltz
Assistant Examiner—Matthew Nguyen
Attorney, Agent, or Firm—Griffin Butler Whisenhunt & Kurtossy

[57] ABSTRACT

A radial field electrostatic micromotor produced by photolithographic micromanufacture includes a stator provided with several groups of electrodes angularly offset from one another about an axis of rotation of the micromotor, an electrically conducting rotor at least one arm of which has a counter electrode adapted to cooperate with the stator electrodes to form an air gap therebetween, and a guide ring adapted to drive the rotor in rotation and possibly in translation. The micromotor has a rotor comprising at least one bridging element arranged at least partly above an electrostatic field plane (PCE) of the micromotor. The bridging element constitutes an elevated arm of the rotor having one or more mechanically or electricity functional members adapted to cooperate with one or more complementary members located in or outside the electrostatic field plane and inside or outside the group of stator electrodes. The micromotor is suitable for the stepwise driving of an extremely miniaturized mechanism in continuous rotation or in bi-directional rotation.

18 Claims, 15 Drawing Sheets

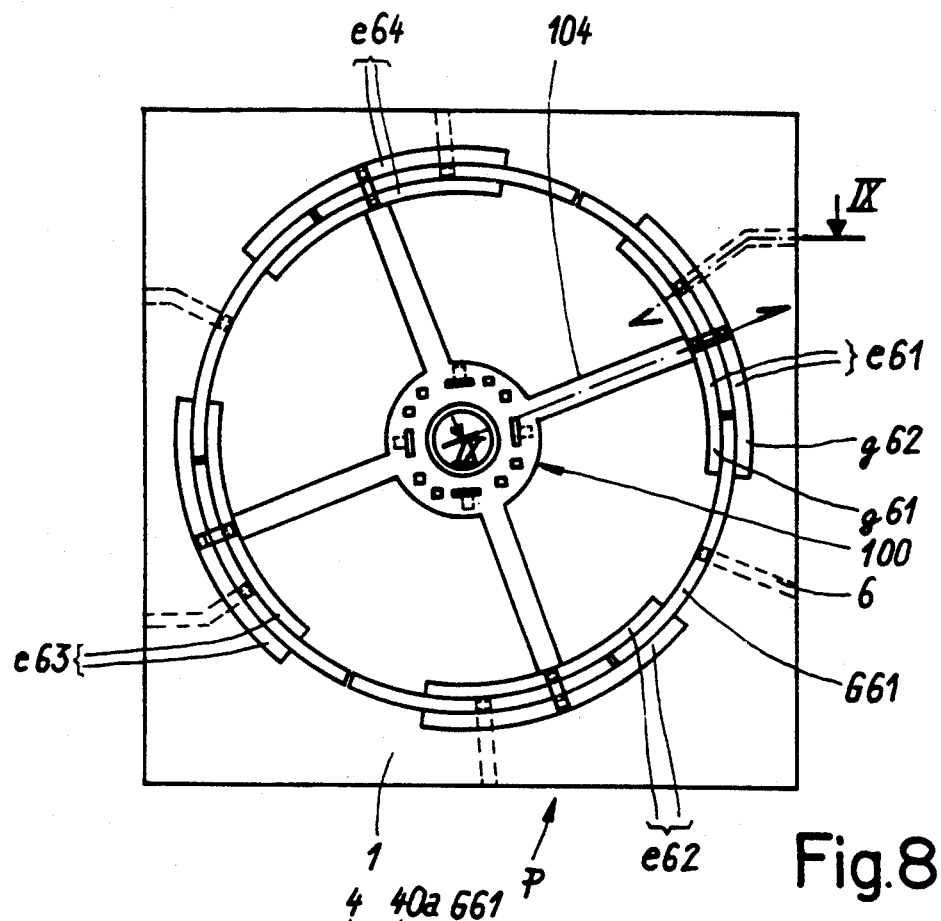
Fig. 8
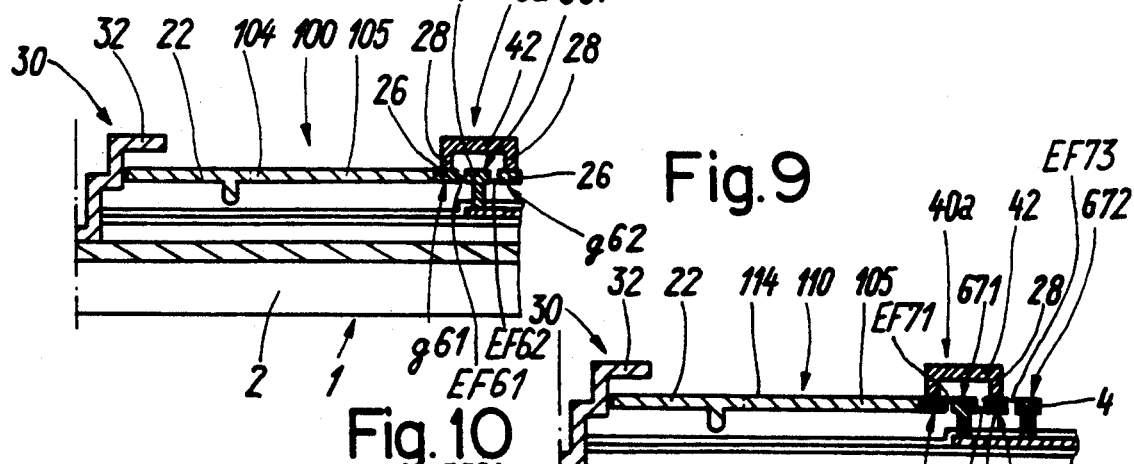
Fig. 9
Fig. 10
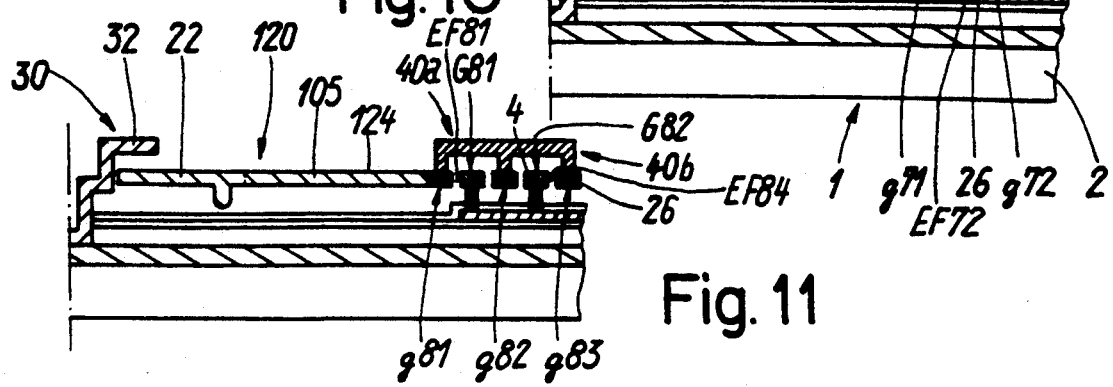
Fig. 11

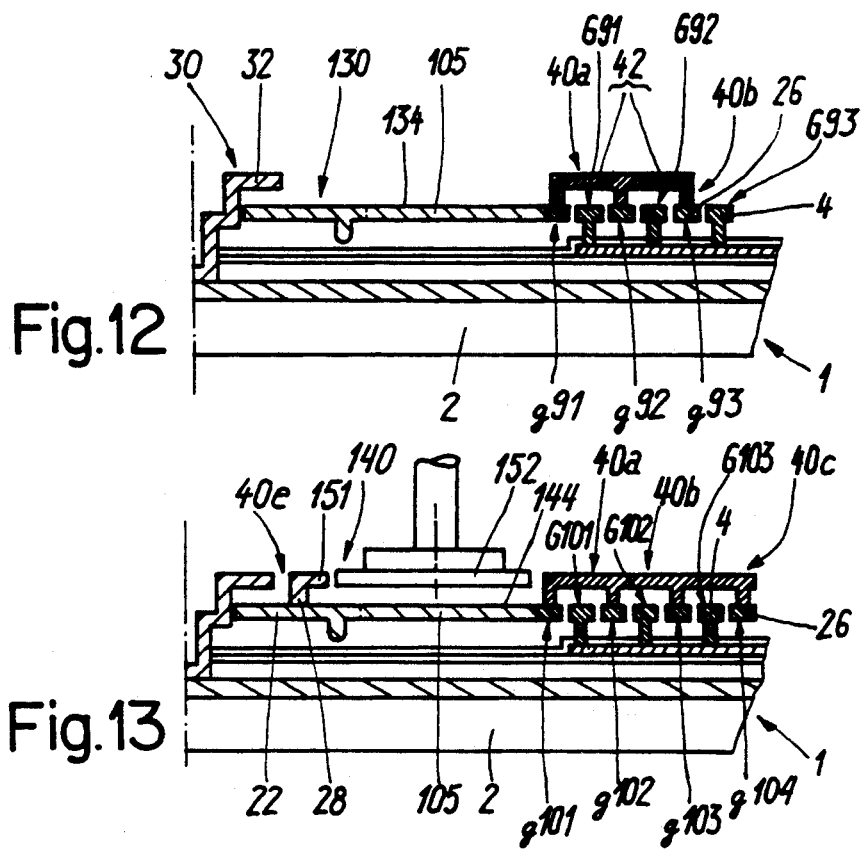
Fig.12
Fig.13
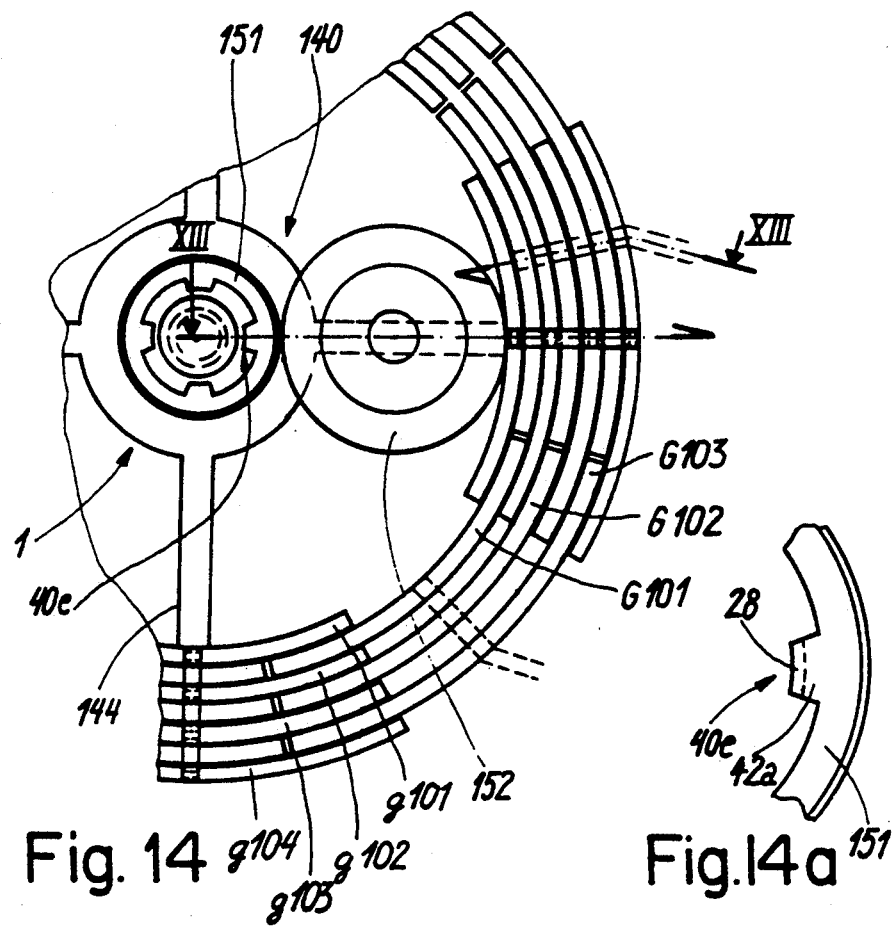
Fig. 14
Fig.14a

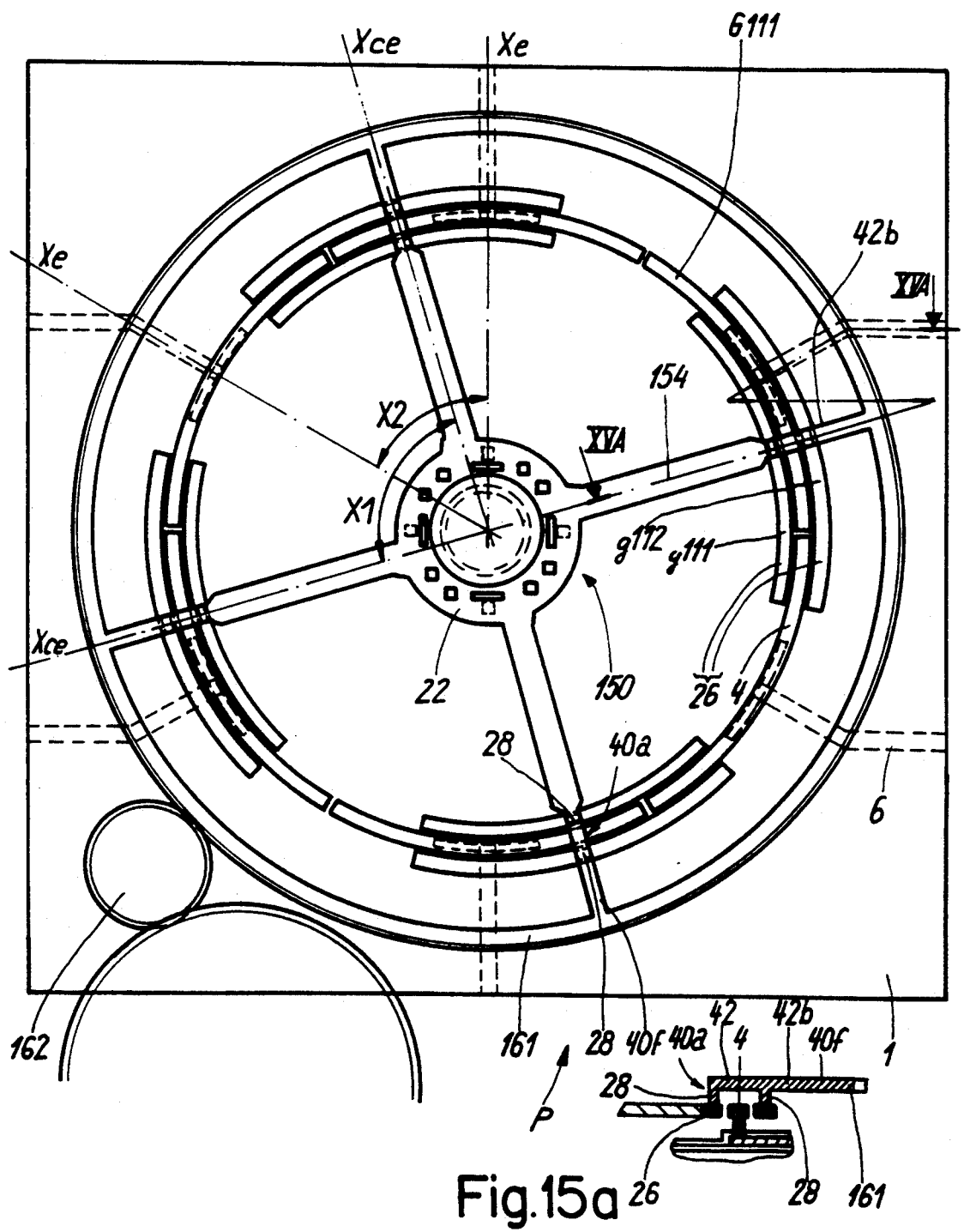

Phase:

Phase:

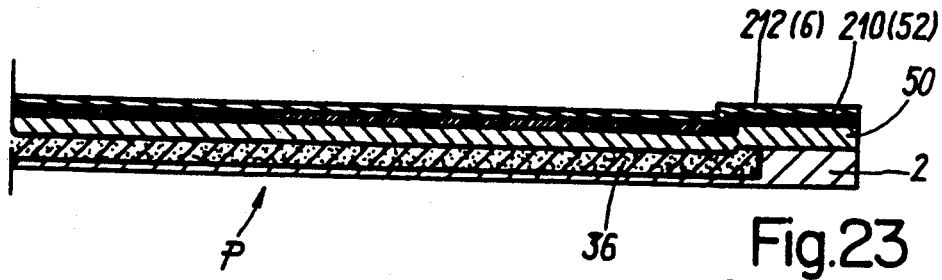
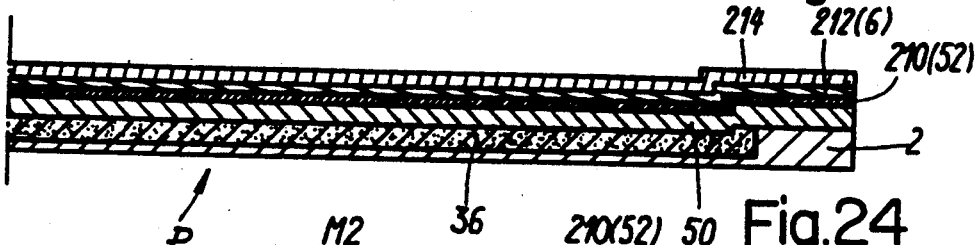
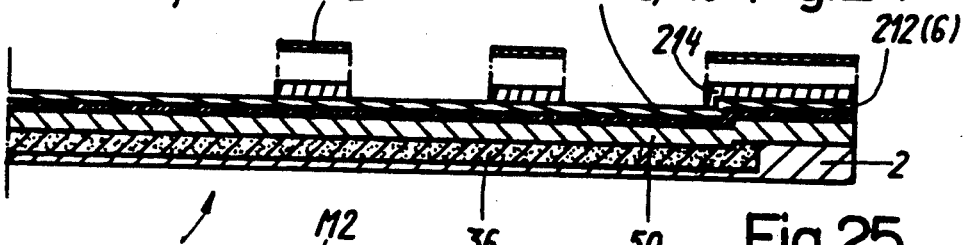
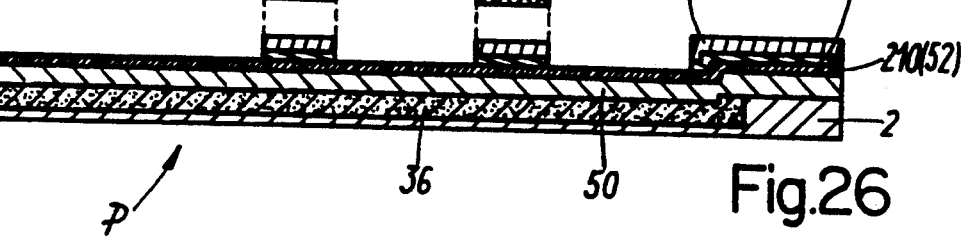
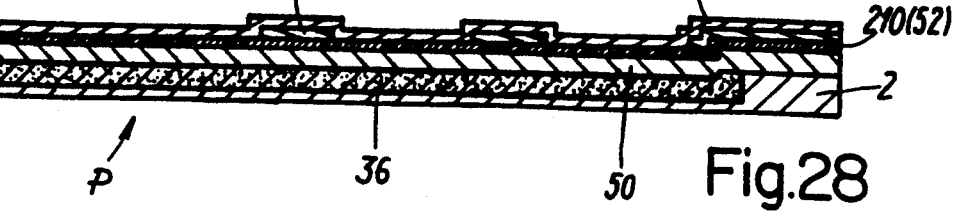

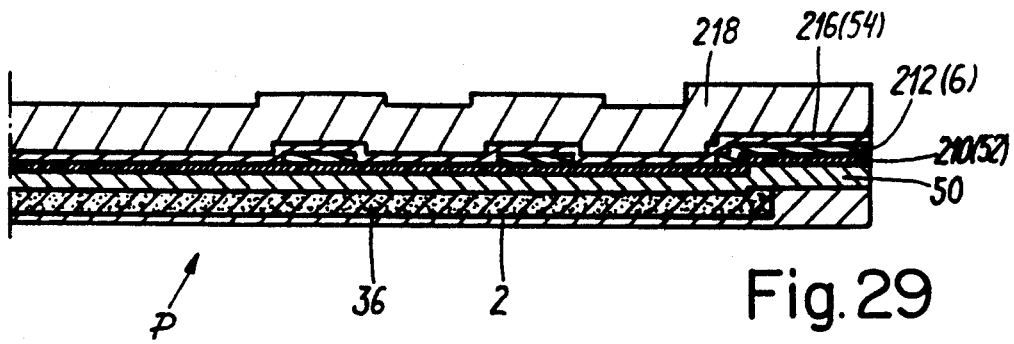
Fig. 29
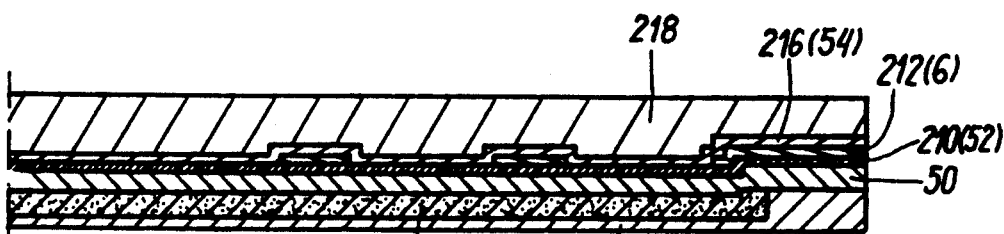
Fig. 30
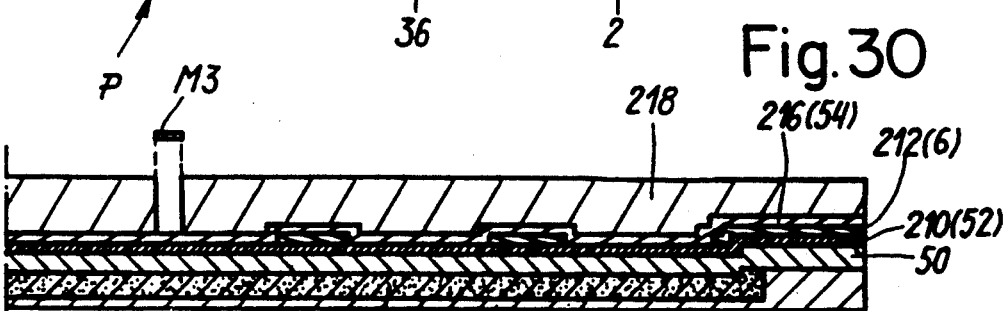
Fig. 31
Fig. 32
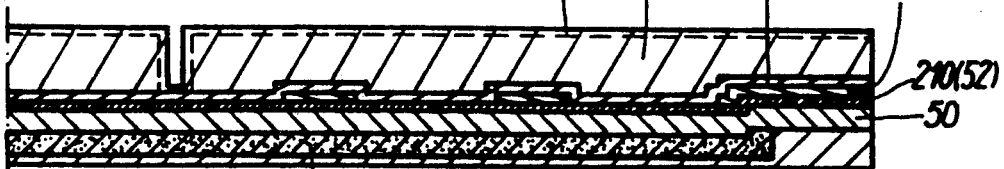
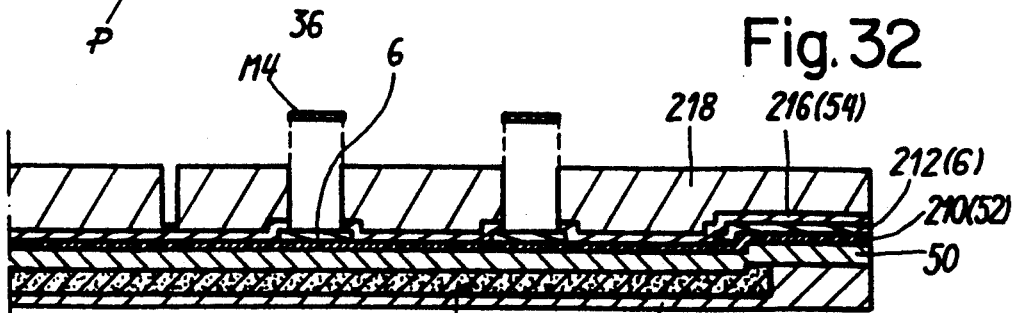
Fig. 33

"RADIAL FIELD ELECTROSTATIC MICROMOTOR PRODUCED USING A PHOTOLITHOGRAPHIC MICROMANUFACTURING TECHNIQUE AND A PROCESS FOR PRODUCING SAID MICROMOTOR"

FIELD OF THE INVENTION

A radial field electrostatic micromotor produced using a photolithographic micromanufacturing technique includes This type of motor is termed a micromotor because of the very small dimensions of some of its components which are measured in microns ($1 \cdot 10^{-6}$ metre).

The technique used to manufacture this micromotor is similar to that used to produce integrated electronic circuits. This technique comprises using vapour phase chemical deposition to form various layers which are then formed using suitably shaped masks in conjunction with chemical or plasma etching.

Due to their size, these micromotors can be used in widely varying applications where power transducers controlled by an electrical signal have to be very greatly miniaturized. These many applications notably include: horology, robotics, informatics, electronic sound and image reproduction apparatus, aeronautics and aerospace as well as biomedical engineering.

DESCRIPTION OF THE PRIOR ART

A motor of this type is described in the publication of the proceedings of the IEEE Conference of the group "Micro Electro Mechanical Systems" held in Salt Lake City, USA from Feb. 20–22, 1989. This motor comprises, on the one hand, a stator provided with several electrodes angularly offset about an axis of rotation of the micromotor and, on the other hand, an electrically conducting rotor comprising four arms, one extremity of which, which forms a counter electrode, is adapted to pass opposite each electrode of the stator.

The stator electrodes which are made of polysilicon are formed on a wafer of a substrate coated with dielectric layers and they are electrically connected to a control circuit.

The rotor, which is also made of polysilicon, has a guide part with four arms extending therefrom. One of the counter electrodes is formed at the extremity of each arm. The guide part, the arms and the counter electrodes are set in the same median plane which is perpendicular to the axis of rotation of the rotor and which coincides with the median plane of the stator electrodes. This plane thus forms an electrostatic field plane in which the rotor turns and which, for this purpose, is engaged with a slight radial play by means of its guide part on a central ring forming a bearing also made of polysilicon and adapted to receive an electrical supply from a planar member set up between this ring and one of the insulating layers of the substrate.

The principal problem that is encountered with this type of micromotor is the performance of the motor couple or useful couple supplied, which is insufficient.

In addition, this micromotor has no means enabling it to drive a mechanism, that is to transmit this couple.

OBJECTS OF THE INVENTION

It is therefore an object of the present invention to overcome these disadvantages by providing an electrostatic micromotor produced by photolithographic micromanufacturing methods having means that make it possible both to transmit the motor couple to an external mechanism and to increase this couple to an adequate level.

BRIEF SUMMARY OF THE INVENTION

The invention therefore relates to a radial field electrostatic micromotor of the type comprising:
- a stator having at least one group of a plurality of electrodes angularly offset about an axis of rotation of the micromotor, said electrodes being connected electrically to a control circuit supported on a substrate,
- a rotor, preferably composed at least in part of an electrically conducting material, having at least one counter electrode adapted to pass across each stator electrode, substantially in one plane designated the electrostatic field plane, whereby the play between said counter electrode and the corresponding electrodes forms an air gap,
- a ring forming a bearing which is adapted to receive an electrical power supply and which is integral with said substrate, said rotor being guided rotatably and optionally in translation about this ring by means of a guide part with which said counter electrode is integral, wherein said rotor has at least one bridging element disposed above the electrostatic field plane, said element constituting an elevated arm of the rotor carrying one or more mechanically or electrically functional members, adapted to cooperate with one or more complementary members located inside or outside the electrostatic field plane and inside or outside said group of stator electrodes.

It will thus be understood that the arrangement of this bridging element disposed at a higher level in relation to the stator electrodes makes it possible to arrange on the same arm of the rotor several counter electrodes disposed in comb form and cooperating in interdigitated manner with other groups of electrodes provided on the stator. The number of air gaps is thus increased as well as, in substantially corresponding manner, the useful couple. In addition, this bridging element makes it possible to provide on the rotor a transmission element of the couple composed of a pinion or of a toothed wheel. It will be noted that the arrangement of this bridging element makes it possible to combine the above-mentioned characteristics, which makes it possible simultaneously to solve the two problems created (transmission and increasing the couple), and this without increasing the thickness of the micromotor and at lower cost, due to a limited number of stages in the photolithographic manufacturing process.

It is also an object of the present invention to provide a photolithographic manufacturing process for an electrostatic motor which comprises:

a)- preferably providing substantially, over the entire surface of a substrate, a first electrically conducting layer adapted to supply a central ring adapted to guide and contact a guide part of a rotor of the micromotor, b)- providing at least one first electrically insulating layer on this conducting layer, c)- forming strip conductors on the said insulating layer, these strips being adapted to supply the stator electrodes by means of a control circuit of the micromotor, d)- preferably depositing at least partially on the preceding layers a layer having a protecting function and a function of friction reduction and electrical insulation, e)- forming, with interposition of a first sacrificial layer, at least one group of electrodes angularly offset about an axis of rotation of the micromotor as well as simultaneously said guide part of the rotor and at least one counter electrode of the rotor, f)- forming above these electrodes and these counter electrodes as well as above this guide part with interposition of a second sacrificial layer said central ring, as well as at least one bridging element constituting an elevated arm of the rotor adapted to be associated with at least one mechanically or electrically functional member, such as a pinion or a wheel, g)- and then removing the sacrificial layers by chemical etching.

BRIEF DESCRIPTION OF THE DRAWINGS

Other features and advantages of the invention will emerge from the following detailed description with reference to the accompanying drawings which are given merely by way of example in which:

FIG. 8 is a plan view of a sixth embodiment of the micromotor of the invention;

FIG. 9 is a partial sectional view taken along the line IX—IX of FIG. 8;

FIGS. 10, 11 and 12 are, respectively, partial sectional views of a seventh, eighth and ninth embodiment of the invention;

FIG. 13 is a partial sectional view of a tenth embodiment of the invention taken along the line XIII—XIII of FIG. 14;

FIG. 14 is a partial exploded plan view of the embodiment of FIG. 13;

FIG. 14a is an enlarged view of a bridging element and a pinion of FIG. 14;

FIG. 15 is a plan view of an eleventh embodiment of the micromotor of the invention;

FIG. 15a is a partial sectional view taken along the line XVA—XVA of FIG. 15; and FIGS. 16 to 46 show partial sectional views of stages in the manufacturing process of the micromotor of the invention.

DETAILED DESCRIPTION OF THE INVENTION

Figure 1:
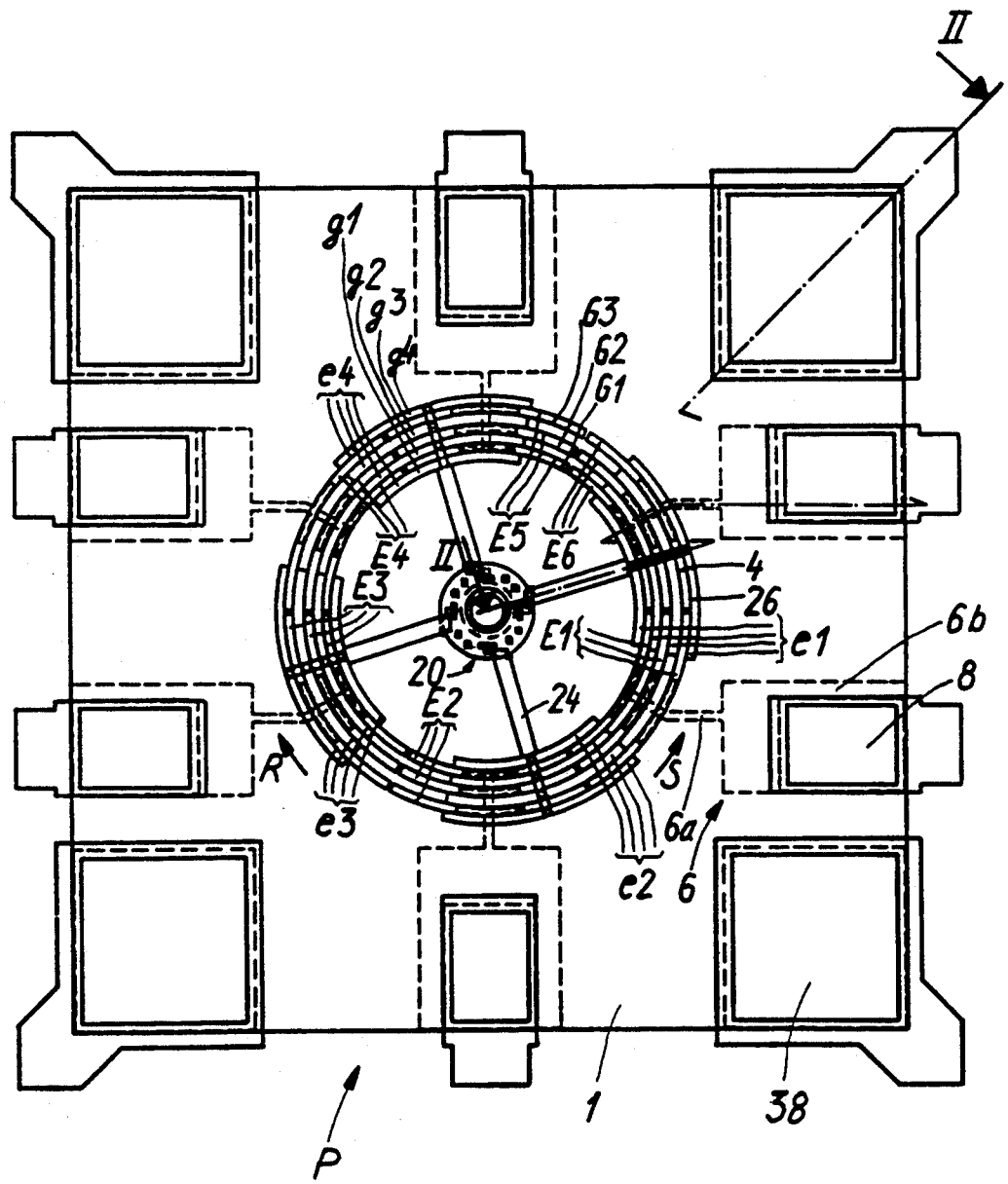
FIG. 1 is a plan view of a first embodiment of the micromotor of the invention provided with supply terminals.
Figure 2:
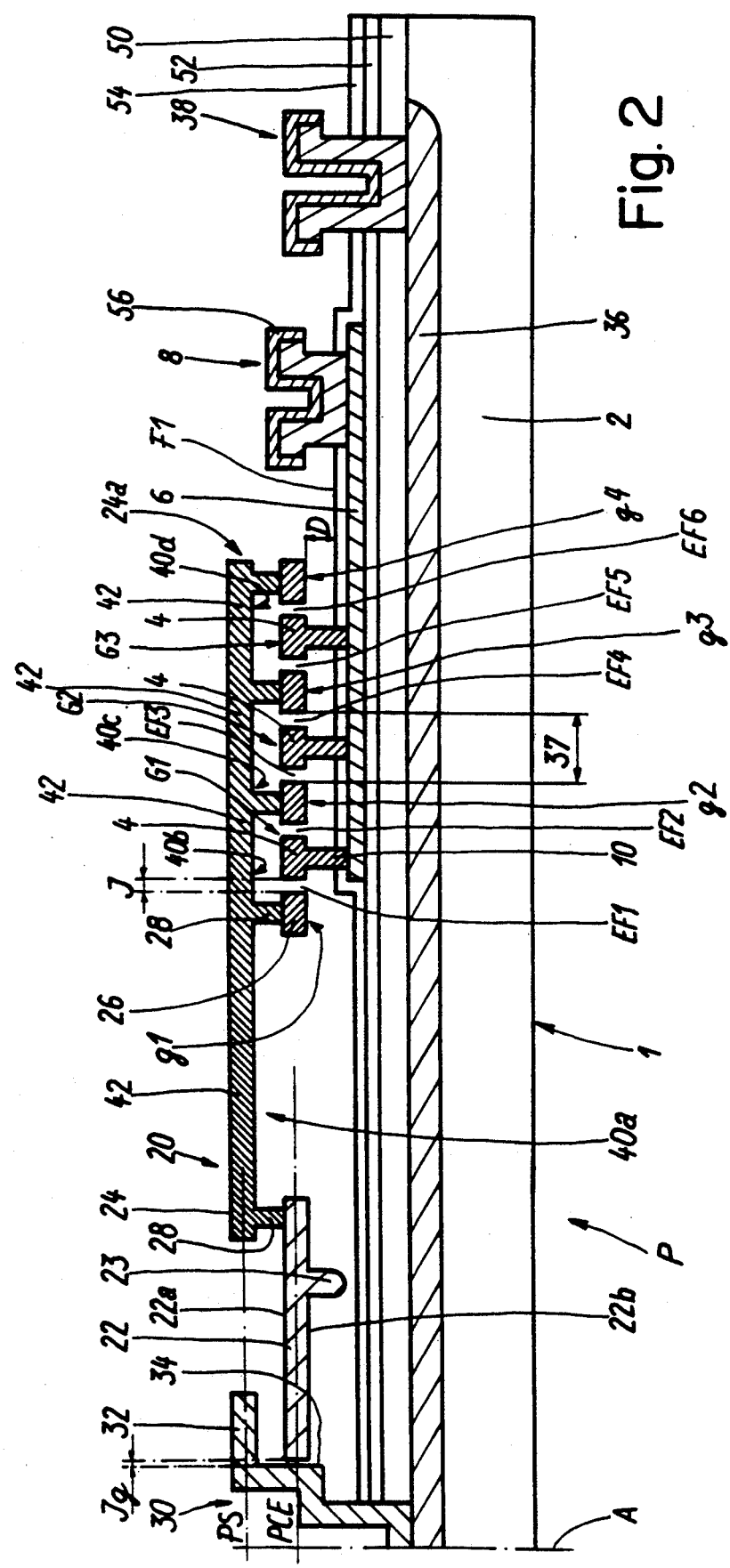
FIG. 2 is a partial sectional view taken along the line II—II of FIG. 1.

Referring first of all to FIGS. 1 and 2 a description will be given of a first embodiment of the electrostatic micromotor of the invention. This radial field electrostatic micromotor has a stator 1 which is provided with various electrodes 4 supported by a planar substrate 2 substantially rectangular in shape.

The term a "group" of electrodes $G_n$ given hereinbelow relates to several electrodes 4 arranged substantially on the same circumference and the definition an "assembly" of electrodes $E_n$ relates to several neighbouring electrodes arranged on different circumferences.

Each group of electrodes G1, G2 and G3 has several electrodes 4 of circular sector shape, which are provided next to each other in concentric manner substantially at the same distance from an axis of rotation A of the rotor.

Each group of electrodes G1, G2 and G3 is thus in the form of a discontinuous ring suitably divided so that each electrode 4 constitutes a unitary element, electrically independent of its neighbours in the same group.

Referring more specifically to FIG. 1, it will be noted that the three electrode groups G1, G2 and G3 are disposed in coaxial manner, their common axis coinciding with the axis of rotation A of the micromotor. It will also be noted that this motor has several electrode assemblies E1 to E6 formed by neighbouring electrodes but which belong to different groups and which are arranged stepwise with respect to each other and in congruence in a same geometric sector of the stator.

More particularly, the micromotor shown in FIG. 1 comprises three electrode groups G1, G2 and G3, whereas it comprises six electrode assemblies, E1 to E6 respectively.

All the electrodes 4 within a same assembly $E_n$ are interconnected electrically by a common supply strip 6 which is connected to a supply terminal 8 adapted to be connected to an electronic control circuit, not shown.

The supply strips 6 comprise two distinguishing parts 6a and 6b, the part 6b on which the corresponding supply terminal 8 rests having a substantially rectangular form, whereas the part 6a, which constitutes the connection between the electrodes 4 and the part 6b presents the form of a segment and has a width that is much smaller than that of the part 6b.

It will be noted that the width of the part 6a placed directly under the electrode assemblies E1 to E6 is much smaller than the arc length of each electrode 4.

The electrodes 4 are connected to the segment 6a of their supply strip 6 by means of a support 10 in the form of a circular sector extending upwardly in a direction perpendicular to the substrate 2. The width and arc length of this support 10 are less at the electrode 4 which it supports, the assemblies support 10—electrode 4 as well as the segment 6a and the corresponding supply strip 6 being substantially centered on the same radius of the rotor. The supports 10 of a given electrode assembly $E_n$ are thus disposed on the same geometric sector.

The motor shown in FIGS. 1 and 2 also comprises a rotor 20 which is composed of a guide part 22 forming a hub which has substantially the shape of an annular wafer from which extend, in coplanar manner and towards the exterior of the axis of rotation A, four arms 24 angularly offset one from another at an angle of 90°. Each arm 24 has at the vicinity of its free extremity 24a a certain number of counter electrodes 26 having an identical configuration to that of the electrodes 4, namely of a sector of a circle.

These counter electrodes 26 are also disposed in "groups" and in "assemblies" as defined hereinabove. Each group g1 to g4 comprises several counter electrodes 26 disposed on a same circumference but angularly offset from one another, whilst the assemblies e1 to e4 comprise respectively the counter electrodes 26 provided inside a same geometric sector, i.e. the counter electrodes 26 of the various groups which are substantially centered on a same radius and which are thus arranged opposite each other, substantially coinciding.

It will thus be noted that this rotor comprises, in this embodiment, four groups g1 to g4 and four assemblies e1 to e4 of counter electrodes 26.

The rotor 20 which is formed so that it can turn in relation to the stator 1 is rotatably guided by a ring or button 30 which forms a bearing and the free extremity of which has a collar 32 which contains the rotor 20 by limiting the axial displacement of the guide part 22 which is mounted with a slight play or clearance jg on the exterior cylindrical circumference 34 of this ring. The ring 30 is integral with the substrate 2 and is integrally secured thereon. Since it is made of an electrically conducting material it can be supplied with current by means of a ground plane 36 which is connected to a supply terminal 38 accessible from the outside to be connected to the electronic control circuit, not shown.

The guide part 22 of the rotor 20 possesses, on its face 22b arranged opposite the stator 1, protruding elements 23 adapted to come into contact with one of the faces F1 of the stator 1.

Referring more particularly to FIG. 2, it will be noted that the stator 1 is composed of a stack of various layers, termed thin layers, which are either conducting or insulating, these layers as well as all the other constituent elements of the micromotor being made by a process of photolithographic micromanufacture referred to as surface micromachining, the steps of which will be explained in greater detail below. This stator 1 can thus be defined as a wafer (because its dimensions are very small) the thickness of which is built up of a series of layers. Its dimensions are about $1 \cdot 10^{-3}$ metres (1 mm) wide and $0.4 \cdot 10^{-3}$ metres (0.4 mm) thick. Since the electrodes 4 of the stator 1 are all supported by a support 10 projecting from the wafer P in a direction parallel to the axis of rotation A of the micromotor, these electrodes 4 are all located at a distance D from the face F1, in a same plane termed the electrostatic field plane PCE.

In addition, in this embodiment, the counter electrodes 26 of the rotor 20 are connected to the arm 24 which supports them respectively by means of a connecting bracket 28 extending from the corresponding arm 24 towards the face F1 of the wafer P.

The counter electrodes 26 are thus provided on the rotor 20 in such a manner that they can be positioned in the electrostatic field plane PCE, notably during excitation of the electrodes 4 by the electronic control circuit of the micromotor. Referring in particular to FIGS. 1 and 2, it will be noted that the radial space 37 which remains between two neighbouring electrodes of a same assembly $E_n$ is such that it makes it possible to accommodate therein a counter electrode 26 of the rotor 20. In addition, due to the circular segmental shape of the electrodes 4 and of the counter electrodes 26, and to the coaxial arrangement of the various electrode groups G1 to G3 and of the counter electrodes groups g1 to g4, the counter electrodes 26 of the rotor 20 engage on both sides of the electrodes 4 of the rotor and are able to move in rotation opposite each electrode 4 of one or more groups G1 to G3 to permit the rotor 20 to be driven in rotation. It will thus be noted that this construction has resulted in a structure having the shape of a fine, interdigitated comb.

The play J remaining between each counter electrode 26 and the electrodes 4 in coincidence form an air gap EF. A structure has thus been created in which the number of air gaps is multiplied, and this without increasing the dimensions of the micromotor.

Six air gaps EF1 to EF6 have been provided for each arm 24, which gives the micromotor 4 (arms)×6, namely 24 air gaps (only the first six being provided with reference numerals).

It has been determined that increasing this number of air gaps as compared to a conventional motor makes it possible, substantially in the same proportions, to increase the transmissible motor couple.

This very advantageous feature of the invention is achieved, inter alia, as a result of the special construction of the rotor 20 and especially of the arm 24.

This arm 24 is composed of several bridging elements 40 which are disposed above the electrostatic field plane PCE. In this embodiment, each arm 24 is composed throughout its length essentially of four bridging elements 40a, 40b, 40c and 40d, each disposed in the extension of others, substantially on a same geometric axis corresponding to one of the radii of the rotor 20. The first elements 40a connect the guide part 22 to the counter electrodes 26 of the first group of counter electrodes g1 which is located inside the circle formed by the first group of electrodes G1. These first elements 40a are connected to the periphery of the guide part 22 by means of connecting brackets 28 which are secured to the face 22a of the guide part 22, opposite the wafer P which forms the stator. The other extremity of these first bridging elements 40a supports thereunder the counter electrode 26 of the first group of counter electrodes g1, and then extends radially to the rotor by a second bridging element 40b, at the extremity of which there extends in perpendicular manner another connecting bracket 28 which is integrally secured to one of the counter electrodes 26 of the second group g2. Two other bridging elements 40c and 40d then succeed each other on each arm 24 supporting respectively the counter electrodes 26 of the third and fourth counter electrode groups g3 and g4. In this embodiment, the four arms 24 are thus disposed completely outside the electrostatic field plane PCE, in part in an elevated plane PS substantially parallel to this latter. The elevated plane PS coincides substantially with the plane in which the collar 32 of the ring 30 is disposed.

Each arm 24 is thus composed of two types of bridging elements 40, the first type 40a being composed of a transverse bar 42 which is located in the higher plane PS and to the two extremities of which there extend respectively two connecting brackets 28. The second type of bridging element, represented by the elements 40b to 40d, is composed of a bar 42 of the same material as the preceding one and having only one connecting bracket 28. The connecting brackets 28 of these two types of bridging elements are thus all of the same material as their corresponding bar 42, whereas they are secured to the underlying element (to the guide part 22 or to a counter electrode 26) during the photolithographic manufacturing process which will be explained below.

The bridging elements 40a to 40d, the guide part 22, the counter electrodes 26, the electrodes 4 with their support 10, the electrical supply strips 6, the supply terminals 8, 38 and the ring forming a bearing 30 are preferably made of a polycrystal-like material such as polysilicon. These elements could be made of another conducting material or of a metal material such as tungsten, chromium, aluminium or a different alloy. The substrate 2 is preferably of semiconducting silicon but it can also be made of a different crystalline semiconducting material such as quartz, diamond or gallium arsenide.

The ground plane 36 which is substantially disposed on the entire surface of the substrate 2 is composed of one piece of silicon of the substrate which is electrically doped. Above this ground plane 36, substantially over the entire substrate 2 there is disposed a layer of silicon dioxide ($SiO_2$) forming an electrically insulating layer on the one hand between the rotor 20 and the substrate 2 and, on the other hand, between the electrodes 4 and the substrate 2. Disposed above this layer 50 is a first layer 52 of silicon nitride ($Si_3N_4$) on which the electrical supply strips 6 are formed. A second layer of silicon nitride 54 is deposited over these strips and over the first layer 52 making it possible, inter alia, to protect the layer of silicon dioxide 50 during chemical etching, but also to prevent electrical breakdown between the rotor 20 and the substrate 2. The supply terminals 8 and 38 are covered by a fine layer of aluminium 56.

Figure 3:
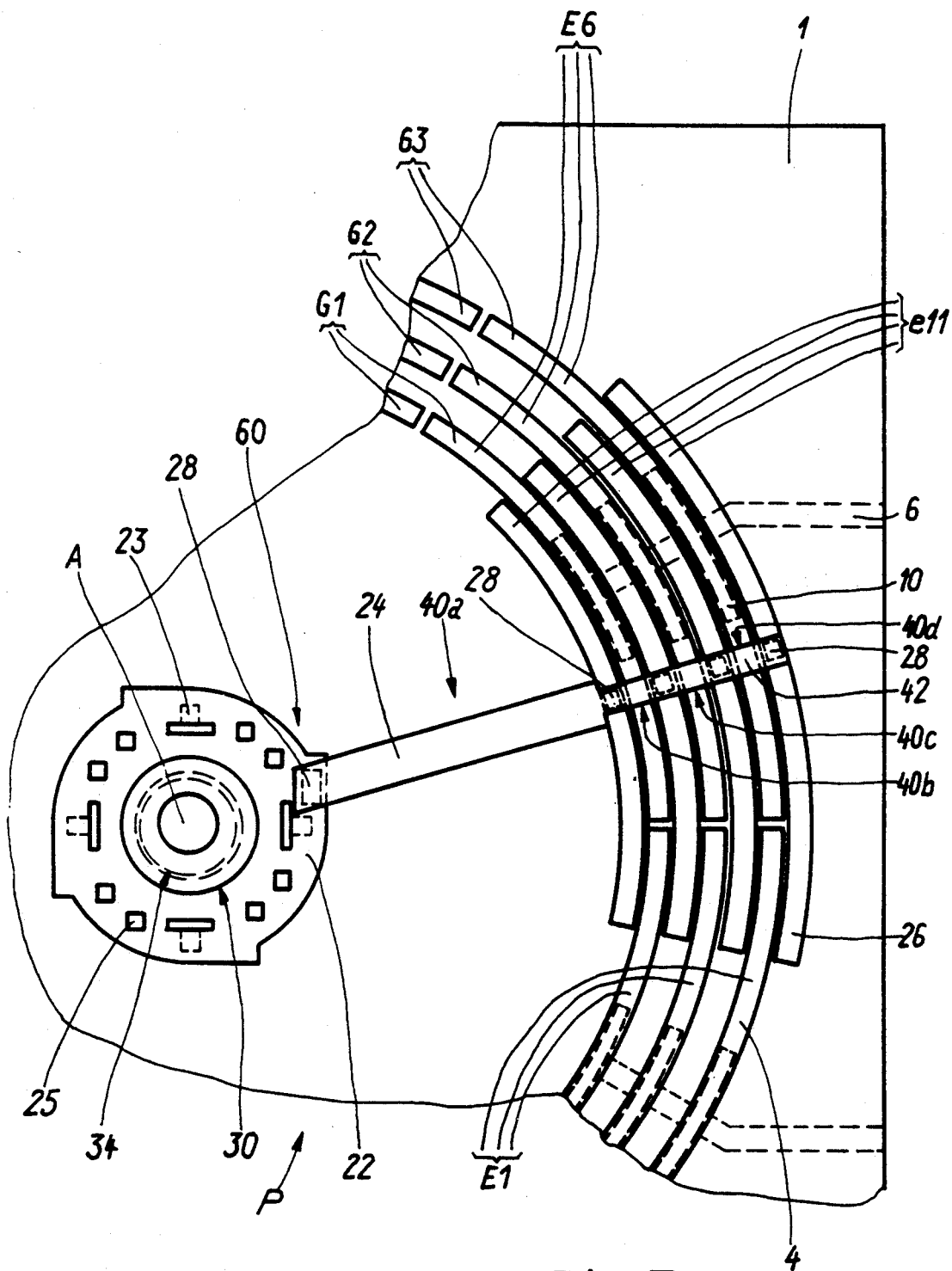
FIG. 3 is a partial plan view of a second embodiment of the micromotor of the invention.

Referring now to FIG. 3, which shows a second embodiment of the micromotor of the invention, it will be noted that the rotor 60 only has one single arm 24 near the free extremity of which four counter electrodes 26 are disposed in an "assembly". This rotor 60 thus only has one assembly ell of counter electrodes 26, this micromotor also comprising several groups and several assemblies of electrodes 4, namely three groups G1, G2, G3 and six assemblies E1 to E6 partially shown in the same manner as in the first embodiment. Whereas in the first embodiment of FIGS. 1 and 2 the electrical supply to the ring 30 via the ground plane 36 and the supply terminal 38 is optional, it is indispensable in this second embodiment if the micromotor is to work.

Figure 4:
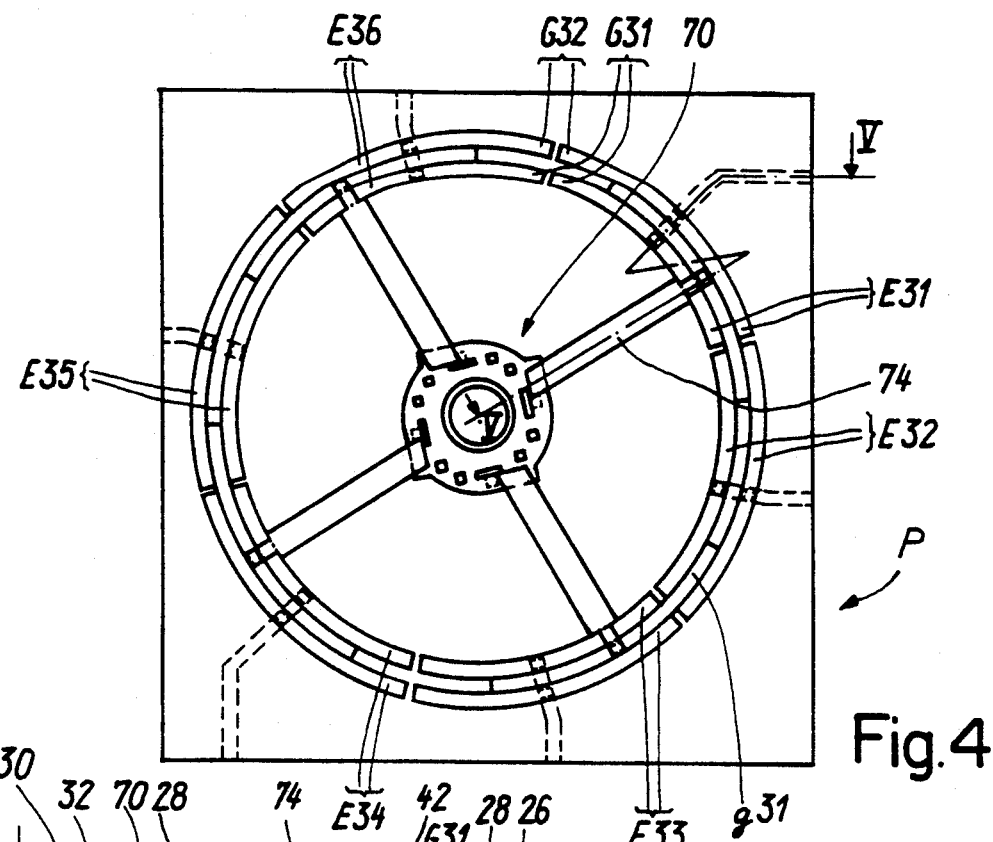
FIG. 4 is a plan view of the micromotor of the invention according to a third embodiment.
Figure 5:
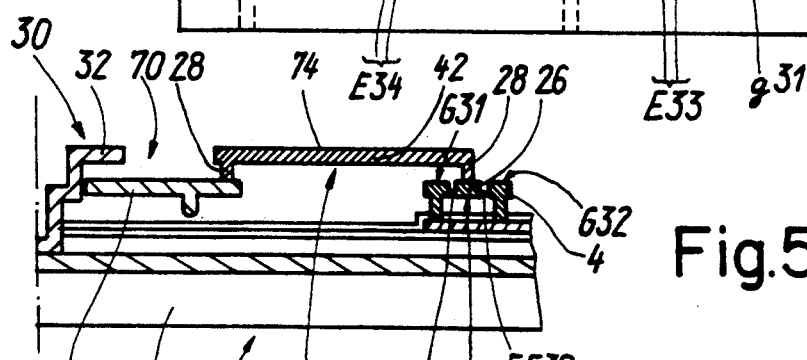
FIG. 5 is a partial sectional view taken along the line V—V of FIG. 4.

Referring now to FIGS. 4 and 5, these show a third embodiment of the electrostatic micromotor of the invention.

The rotor 70 of this micromotor has four arms 74 but it could be composed of a single arm, as shown in FIG. 3.

The micromotor according to this third embodiment only comprises a single group of counter electrodes g31 and only two electrode groups G31 and G32 respectively. It also comprises six electrode assemblies E31 to E36 respectively. The rotor 70 does not have a characteristic counter electrode assembly because each arm 74 only has a single counter electrode 26. In this embodiment, each electrode assembly E31 to E36 has respectively two electrodes 4. The arms 74 are only formed respectively of a single bridging element 40a, one extremity of which is connected to the guide part 22 by a connecting bracket 28 whereas the other opposing extremity which is located outside the first electrode group G31, between this and the second group G32, carries a counter electrode 26 by means of a further connecting bracket 28. The bar 42 of each bridging element 40a partially overlaps the first electrode group G31. Thus, in this embodiment, the arrangement of the first and second electrode groups G31 and G32 arranged in coaxial manner and between which there rotates the counter electrode 26 disposed at the extremity of each arm 74 makes it possible to obtain, for each arm 74, a second air gap EF32 (in addition to an air gap EF31) which already increases the transmissible mechanical couple of the micromotor.

Thus, in this embodiment, on each arm, for n bridging elements (n=1 in this case) associated with n counter electrodes which cooperate with n+1 electrode groups, 2×n air gaps are obtained. With K arms, 2×n×K air gaps are obtained.

Figure 6:
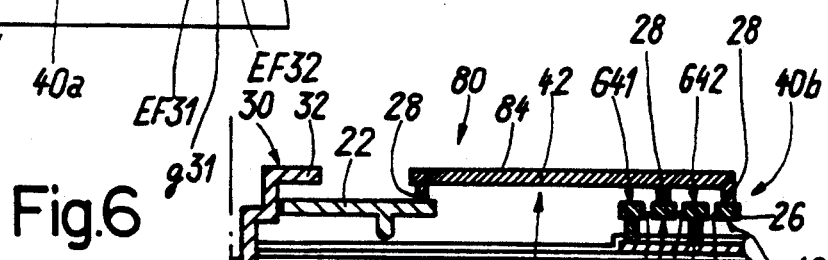
FIGS. 6 and 7 are respectively partial sectional views of a fourth and fifth embodiment of the invention.

In the fourth embodiment shown in FIG. 6, the arm 84 comprises two bridging elements, 40a and 40b respectively, the second bridging element 40b being disposed in the extension of the first 40a, as if it were bonded to the bridging element 40a of the previously described embodiment. In this fourth embodiment, each arm 84 comprises two counter electrodes 26 with the result that this micromotor comprises two electrode groups G41 and G42 associated with two counter electrode groups g41 and g42 to constitute, for each arm 84, three air gaps EF41 to EF43. Thus, in this embodiment, each arm comprises n (in this case n=2) bridging elements each disposed in the extension of the other, associated with n counter electrodes cooperating with n counter electrode groups to form 2n−1 air gaps per arm. For the complete motor with K arms, K×(2n−1) air gaps are obtained.

Figure 7:
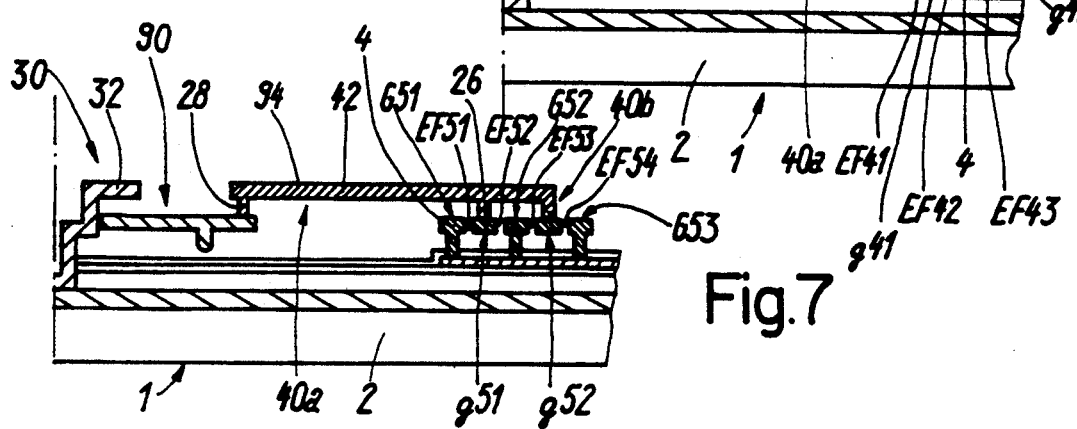
Figure 16:
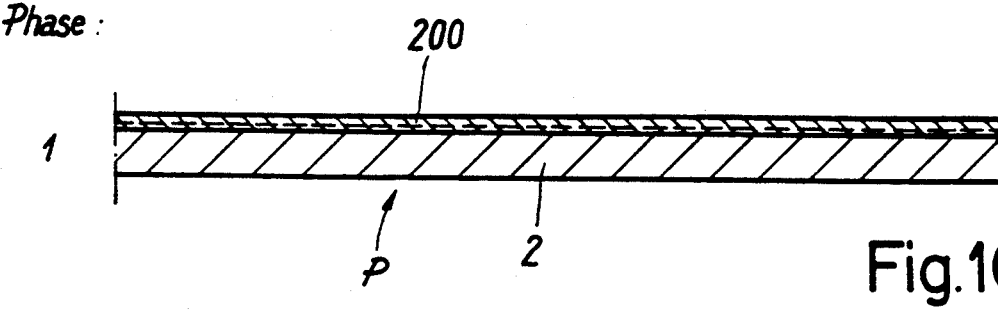
Figure 17:
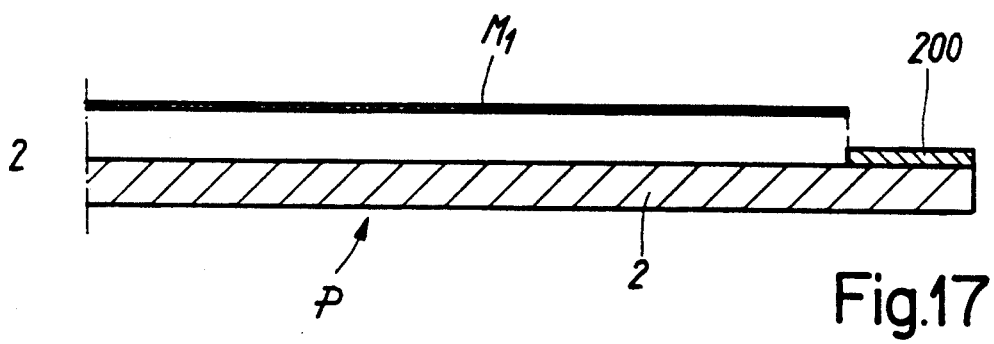
Figure 18:
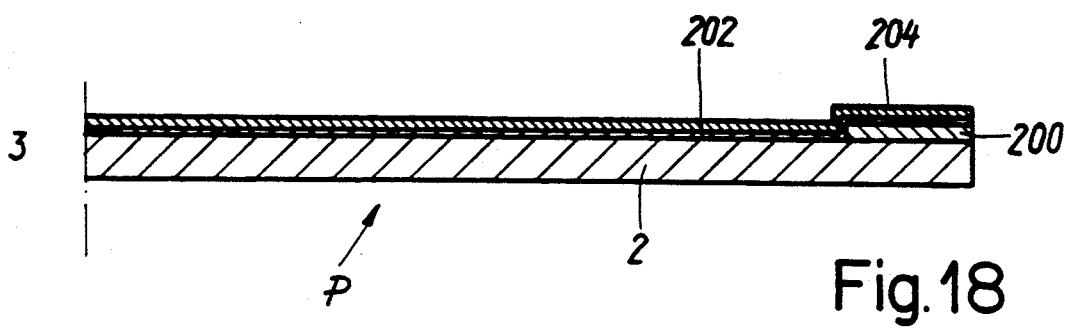
Figure 19:
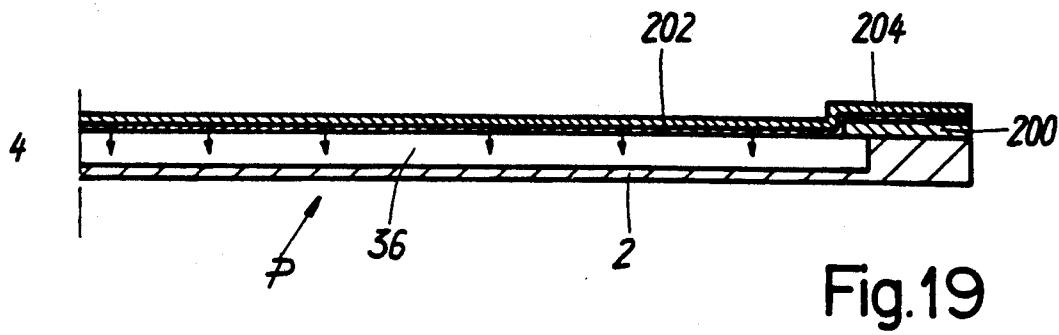
Figure 20:
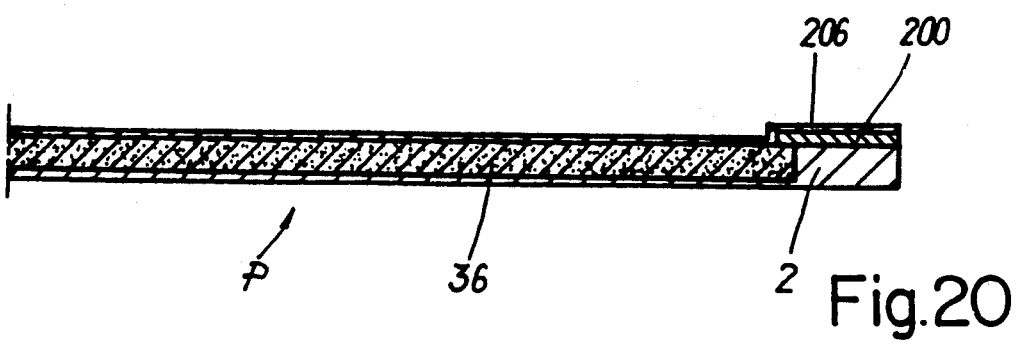

The embodiment of FIG. 7 provides three electrode groups G51 to G53 cooperating with only two counter electrode groups g51 and g52. For each arm 94 four air gaps EF51 to 54 are formed, i.e. one more as compared to the embodiment of FIG. 6. Thus, for n bridging elements per arm 94, the micromotor of this fifth embodiment comprises n+1 electrode groups G51 to G53 which form in pairs an annular electrostatic field zone in which the counter electrodes 26 of one of the two groups g51 and g52 move. It will thus be observed that this embodiment has for each arm 94 n bridging elements associated with n counter electrodes cooperating with n+1 electrode groups to form 2×n air gaps, for K arms 94, K×2×n air gaps are obtained.

In all these embodiments there are provided for each arm one or more bridging elements 40a, 40b each associated with a single counter electrode 26 electrostatically cooperating sometimes with two electrode groups between which it moves and sometimes with a single one (G43) on the outside of which it is arranged in relation to the axis of rotation A of the rotor.

It will be understood that the rotor comprises at least one bridging element which is arranged about the electrostatic field plane PCE to form an elevated arm of the rotor adapted to overlap at least one electrode group by extending therebeyond.

In the embodiments of FIGS. 4 to 7, each bridging element carrying an electrode group passes across the counter electrode which it carries to the outside of the circle formed by this group. Thus each bridging element is capable in constituting an elevated arm of carrying an electrically functional member, namely a counter electrode, adapted to cooperate with one or more complementary members, namely one or more electrodes located in the electrostatic field plane PCE.

Referring now to FIGS. 8 and 9, these show a sixth embodiment of the micromotor of the invention. In this embodiment, each arm 104 is composed of an extension 105 of the guide part 22 which is of the same material as the latter and which is disposed in the same plane as the latter. Disposed at the extremity of this extension 105 is a counter electrode 26 also of the same material as this extension 105 and also formed in the same plane.

This arm 104 comprises a single bridging element 40a the first extremity of which is secured to the counter electrode 26 of the first group g61 by means of a connecting bracket 28 and the second extremity of which is secured to a supplementary counter electrode, termed the second counter electrode. This second counter electrode belongs to a second counter electrode group g62, the connection between the bar 42 of the bridging element 40a and this second counter electrode being effected by means of a connecting bracket 28. These two counter electrode groups g61 and g62 are arranged on either side of a single group of electrodes G61 to form two air gaps EF61 and EF62 per arm 104. In this embodiment n bridging element(s) are provided for each arm 104 comprising respectively n+1 counter electrodes 26 cooperating with n electrode group(s) G61 to form 2×n air gaps. More specifically, for the motor in its entirety which comprises K arms 104, there are K×2×n air gaps for n bridging element(s).

In a seventh embodiment of the micromotor of the invention shown in FIG. 10 there is provided, as in the preceding embodiment, just one bridging element 40a per arm 114 of the rotor 110. This element 40a comprises two counter electrodes 26 arranged at each of its extremities. The micromotor thus comprises two counter electrode groups g71 and g72, but which are associated here with two electrode groups G71 and G72. This embodiment has three air gaps EF71 and EF73 per arm. For each rotor arm there are arranged n bridging elements comprising respectively n+1 counter electrodes cooperating with n+1 electrode groups to form 2n+1 air gaps. For the micromotor one obtains K×(2n+1) air gaps.

In the embodiment of FIG. 11, there is provided one second bridging element 40b for each arm 124 which comprises at its extremity a third counter electrode 26. Thus, compared to the preceding embodiment, there is arranged a third group of counter electrodes g83. In this embodiment for each arm 124 there are provided two bridging elements 40a and 40b associated with three counter electrodes 26 forming on the entire micromotor three counter electrode groups g81 to g83. For each arm 124, these three counter electrodes 26 cooperate with two electrode groups G81 and G82, thus forming four air gaps. More specifically, for each arm 124 there are provided n bridging elements associated with n+1 counter electrodes cooperating with n electrode groups which constitutes 2×n air gaps per arm and K×2×n air gaps for the micromotor.

In this embodiment it will be noted that the terminal counter electrode of the group g83 which is disposed at the free extremity of the second bridging element 40b is arranged outside the second electrode group G82.

This concept is analogous to that of the embodiment of FIGS. 8 and 9 where the supplementary counter electrode of the second group g62 is arranged outside the single electrode group G61.

Reference is now made to FIG. 12 which shows a ninth embodiment of the micromotor of the invention. In this embodiment, each arm 134 comprises two bridging elements 40a and 40b associated with three counter electrodes 26 which cooperate here with three electrode groups G91, G92 and G93 respectively. Thus, for each arm 134 there are disposed n bridging elements which comprise respectively n+1 counter electrodes cooperating with n+1 electrode groups to form 2×n+1 air gaps. For the micromotor one obtains with K arms 134, K×(2×n+1) air gaps.

Referring now to FIGS. 13, 14 and 14a these represent a tenth embodiment of the micromotor of the invention in which the rotor 140 comprises a pinion 151 adapted to mesh with a wheel 152 of a mechanism to be driven, not shown. The pinion 151 is integral with the guide part 22 of the rotor 150 by means of four bridging elements 40e angularly offset from each other by about 90°.

In this embodiment, as shown in particular in FIGS. 13 and 14a, the bridging element 40e is composed of a part of a bar 42a of very short length extending transversely to the axis A and integral with one connecting bracket 28 secured to the upper face of the guide part 22. The pinion 151 and the part of a bar 42a with which it is integral, as well as the connecting bracket 28 are of the same material and can be formed during the same manufacturing stage, as will be explained below.

Thus, the bridging element 40e which rises above the electrostatic field plane PCE carries the pinion 151 which forms a mechanically functional element adapted to cooperate with a complementary member composed of the wheel 152 of the drive mechanism, this complementary member being located outside the electrostatic field plane PCE inside the three electrode groups G101 to G103 and four counter electrode groups g101 to g104.

In another example, not shown, the connecting bracket 28 is directly disposed under the pinion 151 to the right thereof, the bar part 42a being omitted.

FIGS. 15 and 15a show an eleventh embodiment of the micromotor of the invention in which each arm 154 comprises at its free extremity, above the counter electrodes 26, a supplementary bridging element 40f which comprises at its extremity a wheel 161 adapted to mesh with a pinion 162 of a mechanism to be driven. The bridging element 40f is about three times longer than the bridging element 40a which supports the two counter electrodes 26 of the first and second counter electrode groups g111 and g112 (the configuration of this motor being close to that of the embodiment of FIGS. 8 and 9). Thus the wheel 161 which is arranged outside the electrode group G111 and the counter electrode groups g111 and g112 is laterally separated from the electrodes 4 and does not interfere electrostatically with the latter. As may be seen more clearly from FIG. 15a, this wheel 161 is disposed outside the electrostatic field plane because it is supported by a bar 42b of the bridging element 40f, which is arranged in the extension of the bar 42 of the bridging element 40a. It is stressed that the bridging elements 40a and 40f as well as the wheel 161 are of the same material and are produced during the same manufacturing process.

It will be noted that in all the embodiments described on the one hand the counter electrodes 26 of the rotor and on the other hand the stator elements 4 are provided in geometric sectors presenting a substantially equal angle to the centre. In addition, each group of counter electrodes 26 comprises four counter electrodes, the respective median axes Xce of which are offset from each other at an angle X1 of about 90° whereas each electrode group comprises six electrodes the axes Xe of which are respectively offset by an angle X2 of about 60°. It can thus be stated that when the counter electrode(s) 26 of two diametrically opposing arms coincide substantially with an assembly $E_n$ of electrodes 4, the counter electrode(s) 26 of the two other arms partially simultaneously overlap two other electrode assemblies 4 of the stator 1. Thus, when the counter electrode(s) 26 of the two diametrically opposing arms have been electrostatically attracted by two diametrically opposed electrode assemblies 4, the counter electrode(s) of the other arms are already engaged in the electrode assembly 4 which will be able to attract them. It will thus be understood that to make this motor work one simultaneously supplies two supply terminals which are connected to two diametrically opposing electrode assemblies (or to two electrodes) and then supplies the supply terminals which are connected to the two electrode assemblies (or to two electrodes) adjacent to the preceding one(s). A turning field is thus produced which makes it possible to operate the micromotor in continuous rotation or in stepwise rotation, unidirectionally or bidirectionally. A radial field electrostatic motor of variable capacity and of the antisynchronous type has thus been constructed because the rotor turns in the inverse direction to the field applied.

Referring to FIG. 1 and assuming that the electrode assemblies E2 and E5 have been supplied, it will be noted that the rotor will move in the direction of the hands of a watch (arrow R) because the assemblies e2 and e4 of the counter electrodes coincide with the above mentioned assemblies E2 and E5. At the same time, the counter electrode assemblies e1 and e3 overlap the electrode assemblies E1 and E4. Thus, to make the motor advance by one step it will be necessary to simultaneously supply the electrode assemblies E1 and E4 (arrow S). It will thus be noted that one has passed from supply of the assembly E2 (and E5) to the assembly E1 (and E4), which is thus the opposite direction to the direction of the hands of a watch (and to the direction of the arrow R).

Referring now to FIGS. 16 to 46, a photolithographic micromanufacturing process will be described hereinbelow for an electrostatic micromotor such as that of the first embodiment described with reference to FIGS. 1 and 2.

It should be noted that these figures are very diagrammatic and that they do not correspond exactly to the scale of the preceding figures. In these figures, the various components of the micromotor do not have the same dimensional proportions.

These FIGS. 16 to 46 correspond respectively to thirty stages in the manufacturing process. In phase 1, a layer 200 of silicon dioxide ($SiO_2$) is deposited by thermic oxidation on the substrate 2 which is preferably of silicon (Si).

In phase 2, the layer of silicon dioxide 200 is formed using a suitable mask M1 and chemical etching by means of an acid such as buffered hydrofluoric acid, known as BHF, to expose a large opening down to the substrate 2 and to permit access to its upper face.

In phase 3 two layers 202 and 204 of $SiO_2$ are deposited over the entire surface of the wafer P using vapour phase chemical deposition, the layer 202 comprising doping impurities of the type (n), hereafter designated "doping".

Then, in phase 4, the wafer P is annealed to diffuse the doping oxide layer 202 so as to dope a large part of the substrate 2, except for its peripheral edge located under the layer 200.

Then, in phase 5, the layers 202 and 204 of $SiO_2$ are etched so as to leave only the peripheral silicon dioxide layer 200 as well as a doped region of the substrate 2. The doped region of the substrate 2 forms the planar member 36 whereas the peripheral layer 200 forms a part of the insulating layer 50 of the stator 1. In this same phase a new layer 206 of $SiO_2$ is deposited over the doped region 36 and over the peripheral layer 50 by means of vapour phase chemical deposition, which forms a diffusion barrier towards the outside of the wafer P.

Thus, during these five manufacturing phases there has, inter alia, been disposed substantially over the entire surface of the substrate 2 a first electrically conducting layer 36 which, as can be seen in FIG. 2, is adapted to supply the central ring 30.

This layer 36 makes it possible to supply the rotor and its counter electrodes.

Figure 21:
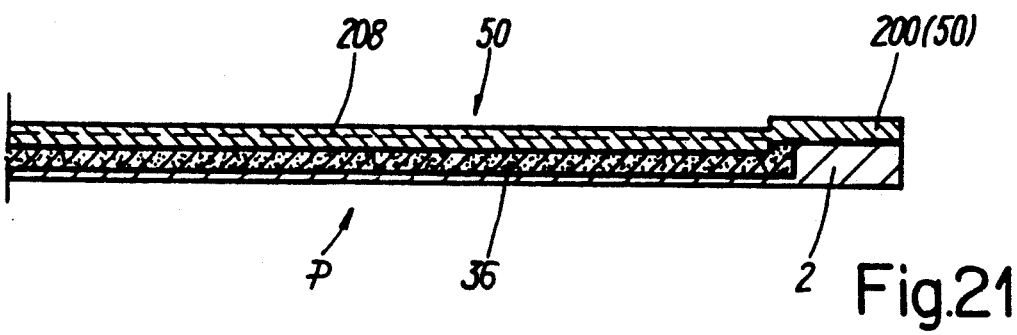
Figure 22:
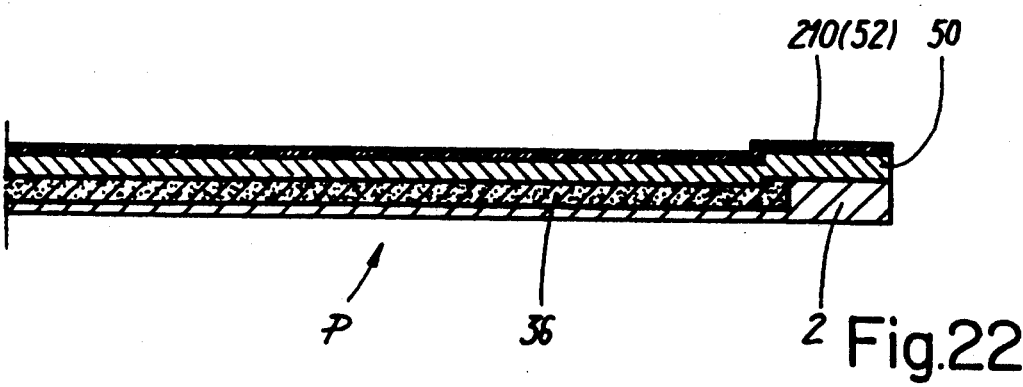
Figure 34:
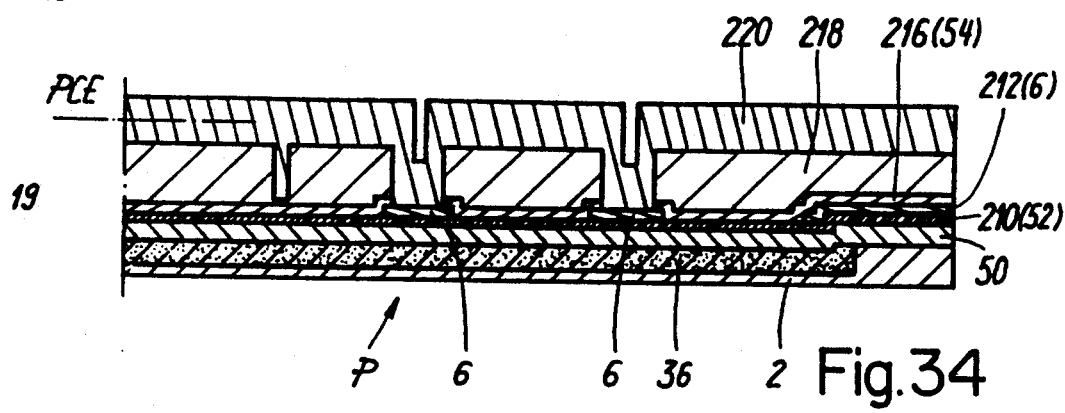
Figure 35:
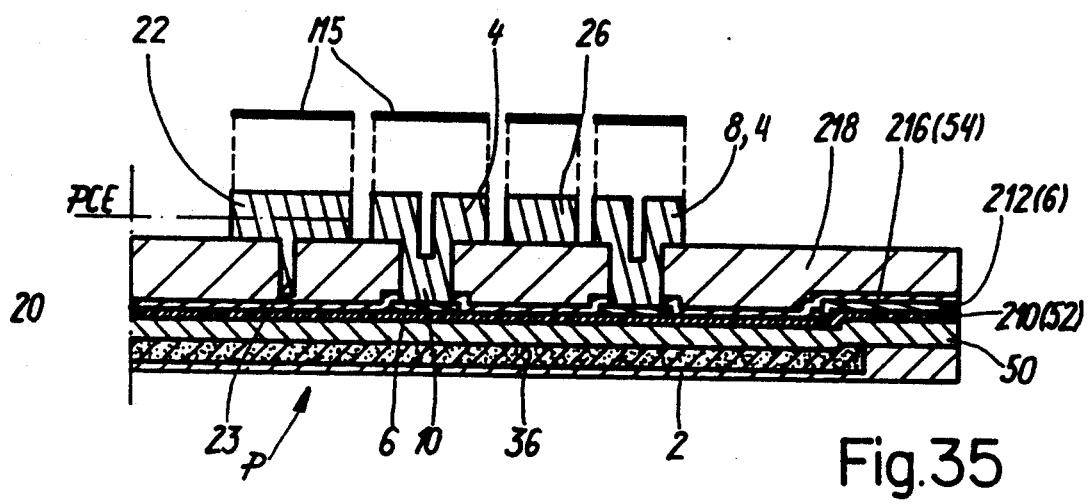
Figure 36:
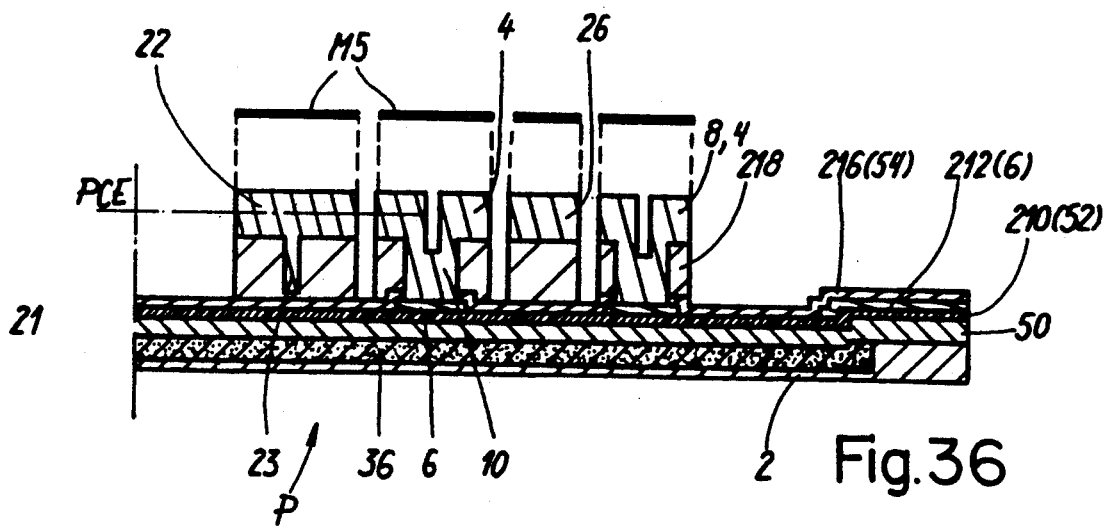
Figure 37:
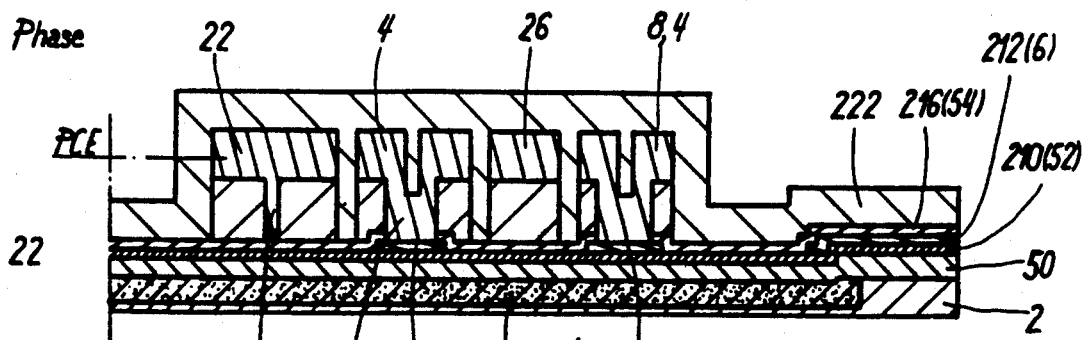
Figure 38:
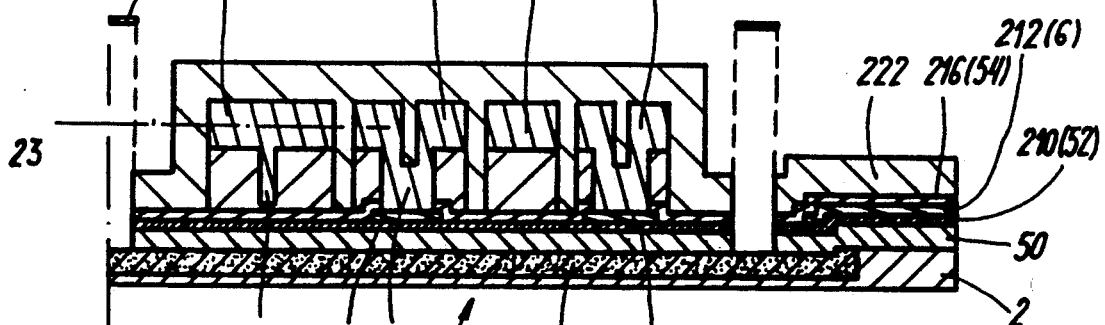
Figure 39:
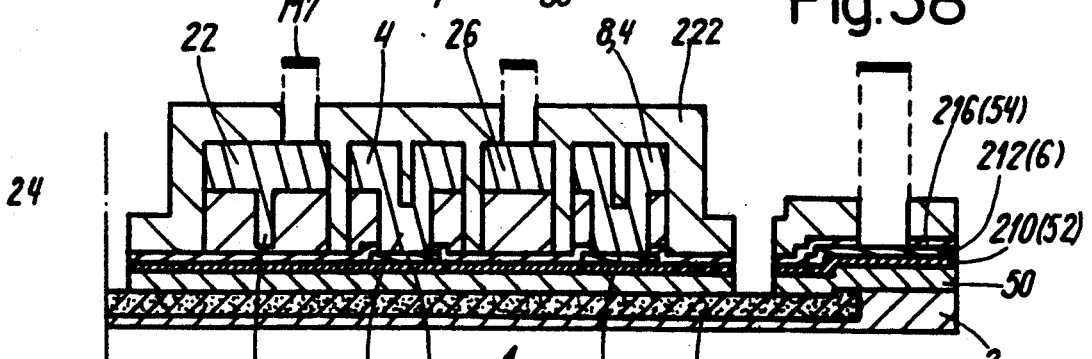
Figure 40:
Figure 41:
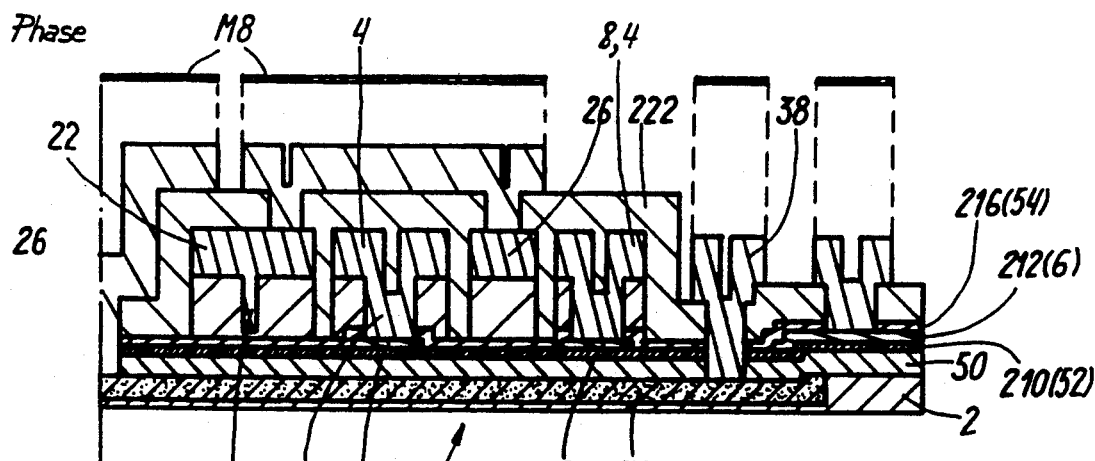
Figure 42:
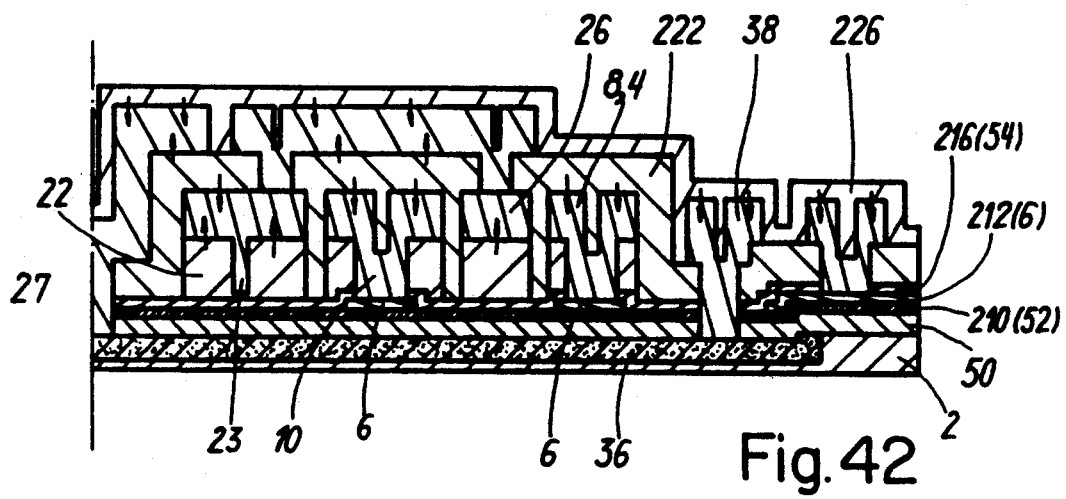
Figure 43:
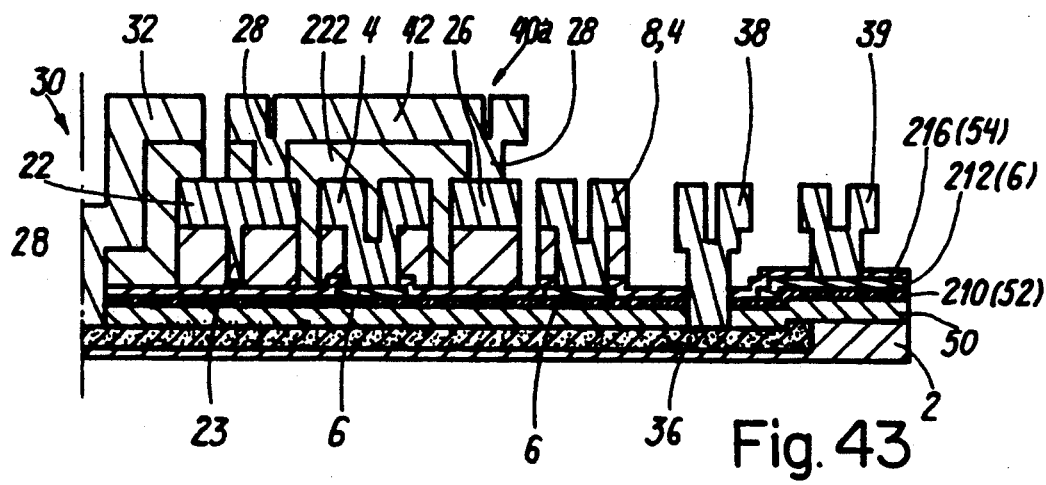
Figure 44:
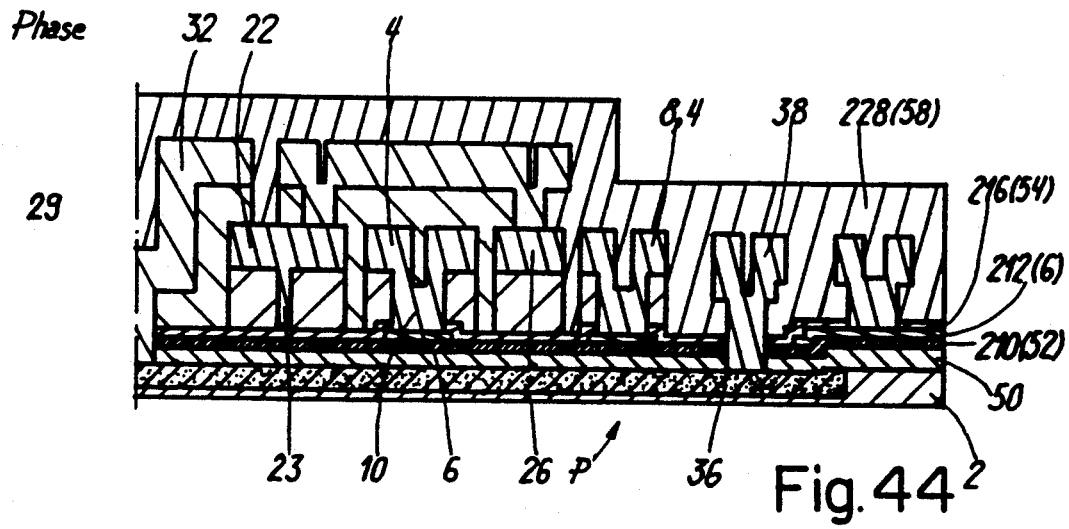
Figure 45:
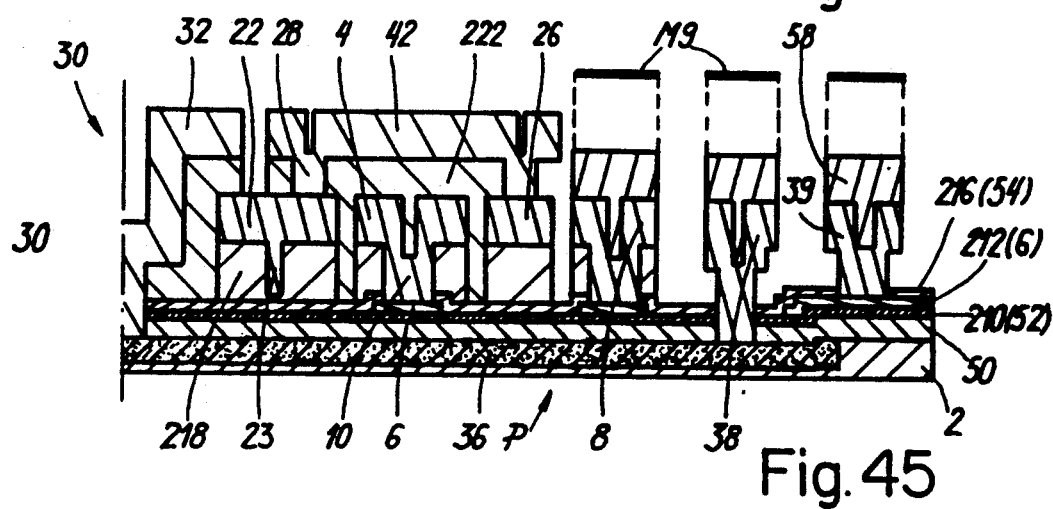
Figure 46:
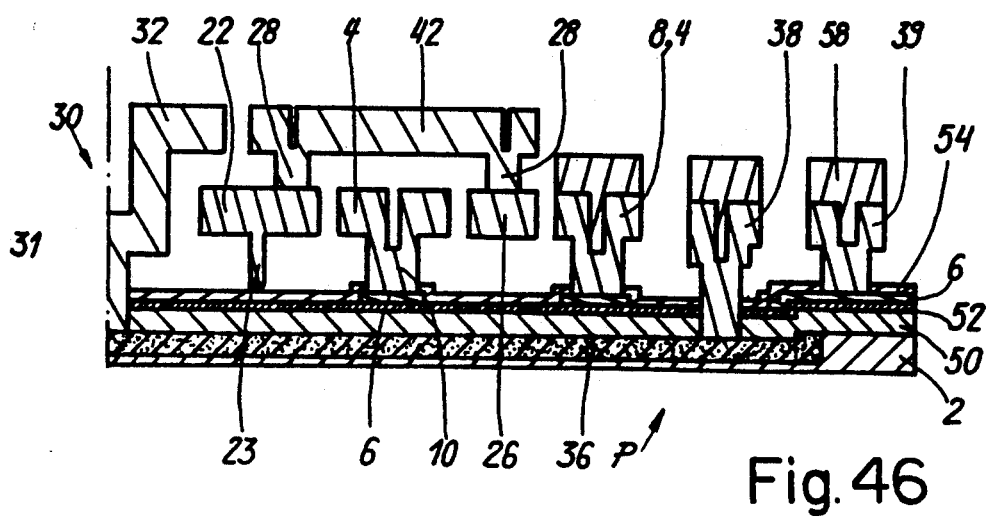

Referring now to FIGS. 21 and 22, these show further phases of the process according to the invention.

During the sixth phase a layer 208 of $SiO_2$ adapted to permit the electrical insulation between the ground plane 36 and the electrodes 4 which will subsequently be deposited and formed is provided by thermic oxidation over the entire surface of the wafer P.

In phase 7 a layer 210 of silicon nitride ($Si_3N_4$) is deposited by low pressure vapour phase chemical deposition. In these two phases 6 and 7 which form a second important stage in the process a first electrically insulating layer 208 has been disposed which corresponds to the layer 50 shown in FIG. 2. The layer 210 forms the layer 52 (FIG. 2).

Referring now to FIGS. 23 and 28, these show respectively the eighth to thirteenth phases of the process of the invention.

In phase 8 a first layer of polysilicon 212 is deposited by means of low pressure vapour phase chemical deposition over the entire surface of the wafer P, i.e. on the previously deposited layer 210 of $Si_3N_4$. To make this process more easily understandable this layer of polysilicon 212 will be referred to as "PolySi I".

In phase 9 this layer of polysilicon is electrically doped by depositing thereon, by means of vapour phase chemical deposition, a layer of doping oxide 214 and then annealing the wafer P permitting diffusion of the doping agent into the layer of PolySi I.

In phase 10 the layer 214 of doping oxide deposited in phase 9 is formed using a set of masks M2 and BHF acid.

In phase 11 the layer 212 of polysilicon I is formed by plasma photolithography using the set of masks M2 which causes the appearance of the layer 210 of silicon nitride deposited during phase 7.

Then, in phase 12, the remaining doping oxide of the layer 214 is etched using BHF acid to completely expose the layer 212 of polysilicon I which has been formed. During this stage (phases 8 to 12) strip conductors 6 (see FIG. 1) have been formed in the polysilicon by means of the set of masks M2 adapted to supply the electrodes 4 of the stator.

In phase 13 a second layer of silicon nitride $Si_3N_4$ is deposited over the entire wafer P by low pressure vapour phase chemical deposition. This second layer of silicon nitride protects the underlying layers during subsequent chemical etching and serves to reduce the coefficient of friction (the rotor 22 being able to bear against the protuberant elements 23 on the rotor 1, see FIG. 2) whilst the motor is operating. This layer 216 is thus also able to improve the mechanical characteristics of the micromotor by providing protection against wear. This corresponds to the layer 54 of FIG. 2.

It should be noted that other materials, such as diamond, can fulfil this function and be deposited instead of $Si_3N_4$.

In phase 14 a layer 218 of phospho silicate glass, generally known under the British abbreviation "PSG" is deposited on the wafer P.

In phase 15 the wafer P is annealed to smooth the outside face of the layer 218. This layer 218 will be referred to as the "PSG I I" layer.

In phase 16 openings are made in the PSG I layer using a mask M3 to form, as will be explained below, protruding elements 23 of the rotor 22. This modification of the PSG I layer is effected by chemical etching using buffered hydrofluoric acid.

In phase 17 a doped oxide layer 219 is deposited by vapour phase chemical deposition making it possible to coat the second layer 216 of silicon nitride which was exposed during the chemical etching.

In phase 18 supplementary openings are made in the PSG I layer 218 so as to provide supports 10 for the electrodes 4 of the stator, as will be seen from the following steps. In this case a photolithographic plasma method is used. It will thus be noted that in this phase 18 certain regions of the layer 218 to the right of certain parks of the strip conductors 6 have been removed, but that part of the silicon nitride layer 216 above these parts of strip conductors 6 has also been etched.

In phase 19 a second layer 220 of polysilicon, termed polysilicon II is deposited on the wafer P using low pressure vapour phase chemical deposition.

In phase 20 this second layer of polysilicon II is formed by plasma photolithography using a set of masks M5 to define the guide part 22, the electrodes 4 of the stator, the counter electrodes 26 of the rotor and possibly also the supply terminals 8 which are adapted to permit supply of the electrodes 4 of the stator. In this phase one can also simultaneously create the extensions 105 of FIGS. 9 to 15.

In phase 21 the part of the PSG I layer 218 which is not located under the structural elements 22, 4, 26 and 8 is formed by the set of masks M5 and also using plasma. It should be noted here that the part of the PSG I layer 218 which is under these structural elements constitutes a sacrificial layer which will subsequently be removed by chemical etching. It will thus be noted that in stages 14 to 21 at least one group of electrodes 4 of the stator has been formed with interposition of a first sacrificial layer set up around the axis of rotation of the micromotor in angularly offset manner (FIG. 1) as well as simultaneously the guide part 22 of the rotor, at least one counter electrode 26 of the rotor and preferably the supply terminals 8 as well as optionally the extensions 105. These phases 14 to 21 thus constitute an essential supplementary stage in the process of the invention.

In phase 22 (FIG. 37) a second layer 222 of phospho silicate glass (PSG II) is deposited by means of vapour phase chemical deposition on the functional elements formed in the preceding phases.

In phase 23 part of this second layer 222 of PSG II as well as certain regions of the two layers of silicon nitride 216, 210 and of the layer of silicon dioxide 50 are etched by plasma photolithographic forming. This phase thus prepares the realization of the central ring 30 as well as that of the supply terminals 38 of the ground plane 36. This forming is effected using a set of masks M6.

In phase 24 plasma photolithography with a mask M7 is again used to create certain parts of the second layer 222 of PSG II to permit securing it to the guide part 22 and to the counter electrodes 26 of the connecting brackets 28 as well as possibly the formation of a supply terminal 39 (FIG. 31) permitting supply of the strips 6.

In phase 25 a third layer 224 of polysilicon, termed polysilicon III, is deposited over the entire surface of the wafer P using low pressure vapour phase chemical deposition.

Then, in phase 26, the third layer 224 of polysilicon III is formed using plasma photolithography with a mask M8 so as only to leave the functional parts needed. Part of the second layer 222 of phospho silicate glass (PSG II) is thus exposed.

In phase 27 a layer 226 of doping oxide $SiO_2$ is deposited on the entire wafer P using vapour phase deposition before annealing the wafer P permitting doping of the second and third layers of polysilicon II and III respectively, rendering these conducting as well.

In phase 28 the most accessible parts (i.e. the parts exposed on the surface) of the sacrificial layers are etched with acid to prepare for the deposition of aluminium onto the supply terminals.

It will thus be understood that in these phases 22 to 28, the electrodes 4 of the rotor, the supply terminals 8, the central guide ring 30, but also various bridging elements 40 which constitute, as explained above, elevated arms of the rotor associated with mechanically or electrically functional members have been formed with interposition of a second sacrificial layer and above the guide part 22.

In this process one counter electrode 26 has been shown solely as a functional element but it would of course have been possible to show the pinion 151 or also the wheel 161 respectively of FIGS. 14 and 15.

In phase 29 a layer of aluminium 228 is deposited by evaporation on the wafer P.

In phase 30 the layer of aluminium 228 is modified with the aid of a mask M9 so as only to leave one film on the supply terminals 8 and 38 and permit connection to an electronic control circuit, not shown.

In phase 31 the remaining sacrificial layers formed respectively by the two layers of phospho silicate glass PSG I and PSG II are etched for a relatively long time using buffered hydrofluoric acid (BHF).

It will be noted that to facilitate the chemical etching of the underlying sacrificial layers the guide part 22 of the rotor comprises appropriately distributed clear axial openings 25 (for example carried out during phase 20) permitting better irrigation of the etching acid.

Moreover although only a single electrode 4 of the rotor has been shown it is clear that it is possible to simultaneously produce several coaxial electrode groups such as the groups G1 to G3 of FIG. 1. Instead of supply terminals 8 it is possible to form an electrode group 4 by removing the aluminium layer thereon.

Similarly, it is possible to produce simultaneously and with the same layer several counter electrode groups, such as the groups g1 to g4 of FIG. 1, arranged on either side of the electrode groups $G_n$. The bridging elements 40a to 40d are also simultaneously produced. They are produced with another layer of polysilicon (inter alia the layer of polysilicon III) than the electrodes and the counter electrodes. Each of the bridging elements being disposed in the extension of the other, their connecting bracket 26 is secured to the guide part 22 or on the corresponding counter electrode(s) which are formed by underlying layers.

It will thus be understood that due to the arrangement of the bridging elements which may advantageously be produced at the same time as the central ring 30 it has been possible to solve, both the problem of the transmission of the couple by judicious mechanical liaison between the rotor and a pinion or a toothed wheel, and the problem of the increase of the transmissible motor couple by multiplying the number of air gaps due to the construction of an interdigitated structure.

We claim:

1. A radial field electrostatic micromotor produced by photolithographic micromanufacture of the type comprising:
    a stator having at least one group of a plurality of stator electrodes angularly offset about an axis of rotation of the micromotor, said stator electrodes being connected electrically to a control circuit supported on a substrate,
    a rotor, preferably composed at least in part of an electrically conducting material, having at least one counter electrode adapted to pass across each stator electrode substantially in one plane designated the electrostatic field plane, whereby a clearance between said counter electrode and a stator electrode forms an air gap,
    a ring forming a bearing adapted to receive an electrical power supply and which is integral with said substrate, said rotor being guided rotatably and optionally in translation about said ring by means of a guide part with which said counter electrode is integral, wherein said rotor has at least one bridging element disposed at least in part about said electrostatic field plane, said bridging element constituting an elevated arm of the rotor carrying one or more mechanically or electrically functional members adapted to cooperate with one or more complementary members located inside or outside the electrostatic field plane and inside or outside said group of stator electrodes.

2. A micromotor according to claim 1 wherein one of said mechanically or electrically functional members is composed of said counter electrode of the rotor which is disposed between said electrode group forming a first electrode group and a second electrode group disposed coaxially to the first electrode group, a clearance remaining between said counter electrode and the second electrode group forming a second air gap.

3. A micromotor according to claim 1 wherein each arm of the rotor has n bridging elements some disposed int he extension of the others, said n bridging elements having respectively n counter electrodes cooperating in interdigitated manner with at least n electrode groups arranged in coaxial manner to form at least 2n−1 air gaps where n is an integer greater than zero.

4. A micromotor according to claim 3 which has n+1 electrode groups forming in pairs an electrostatic field zone in which one of the counter electrodes moves to form 2×n air gaps.

5. A micromotor according to claim 1 wherein one of said mechanically or electrically functional members is composed of a supplementary counter electrode, designated a second counter electrode, said second counter electrode being disposed outside the electrode group of the stator, a clearance remaining between said second counter electrode and the electrode group forming a supplementary air gap.

6. A micromotor according to claim 5 wherein each arm of the rotor has n bridging elements some disposed in the extension of the others, said n bridging elements having respectively n+1 counter electrodes cooperating with at least n electrode groups to form at least 2×n air gaps where n is an integer greater than zero.

7. A micromotor according to claim 6 which has n+1 groups of electrodes to form, with the n+1 counter electrodes, 2n+1 air gaps.

8. A micromotor according to claim 1 wherein said at least one bridging element member is composed of a first pinion or a first wheel adapted to mesh with a drive wheel or a drive pinion respectively of a drive mechanism.

9. A micromotor according to claim 8 wherein in which said at least one bridging element has an electrically functional member composed of a counter electrode of the rotor.

10. A micromotor according to claim 8 having n bridging elements, the nth bridging element or terminal bridging element comprising the first wheel.

11. A micromotor according to claim 8 wherein said first pinion or said first wheel is integral with the rotor by means of at least two bridging elements preferably arranged on the rotor in a diametrically opposed manner.

12. A micromotor according to claim 11 wherein said first pinion or said first wheel is integral with the rotor by means of four arms offset from one another by about 90°.

13. A photolithographic manufacturing process for an electrostatic micromotor said process comprising:
    a)- preferably providing substantially over an entire surface of a substrate a first electrically conducting layer adapted to supply a central ring capable of guiding and contacting a guide part of a rotor of the micromotor,
    b)- providing at least one first electrically insulating layer on said electrically conducting layer,
    c)- forming electrically conducting strips on said first electrically insulating layer, said strips being adapted to supply the stator electrodes by means of a control circuit of the micromotor,
    d)- depositing at least partially on the preceding layers preferably one layer having a protecting function and a function of friction reduction and electrical insulation,
    e)- forming, with interposition of a first sacrificial layer, at least one group of electrodes angularly offset about an axis of rotation of the micromotor as well as simultaneously said guide part of the rotor and at least one counter electrode of the rotor,
    f)- forming above said electrodes and said counter electrodes as well as above said guide part, with interposition of a second sacrificial layer, said central ring as well as at least one bridging element constituting an elevated arm of the rotor adapted to be associated with at least one mechanically or electrically functional member such as a pinion or a wheel,
    g)- and then removing the sacrificial layers by chemical etching.

14. A process according to claim 13 wherein stage f) simultaneously forms supply terminals and electrodes.

15. A process according to claim 13 wherein there is formed in stage e) at least one arm-like extension adapted to provide a mechanical connection between the guide part of the rotor and the counter electrode(s).

16. A process according to claim 13 wherein several groups of coaxially disposed electrodes are simultaneously formed during stage e).

17. A process according to claim 15 wherein several counter electrodes arranged on either side of the group(s) of counter electrodes are produced during stage e).

18. A process according to claim 16 wherein several bridging elements some substantially aligned in the extension of the others and associating with the corresponding underlying counter electrode are simultaneously produced during stage f).

* * * * *